(12) United States Patent
Mori et al.

(10) Patent No.: US 10,765,986 B2
(45) Date of Patent: *Sep. 8, 2020

(54) PLUGGED HONEYCOMB STRUCTURE

(71) Applicant: NGK INSULATORS, LTD., Nagoya (JP)

(72) Inventors: Kazuya Mori, Nagoya (JP); Mitsuhiro Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 493 days.

This patent is subject to a terminal disclaimer.

(21) Appl. No.: 15/704,393

(22) Filed: Sep. 14, 2017

(65) Prior Publication Data

US 2018/0099241 A1     Apr. 12, 2018

(30) Foreign Application Priority Data

Oct. 11, 2016   (JP) .................................. 2016-200350

(51) Int. Cl.
*B01D 46/24*     (2006.01)
*F01N 3/022*     (2006.01)

(52) U.S. Cl.
CPC ....... *B01D 46/247* (2013.01); *B01D 46/2474* (2013.01); *B01D 2046/2481* (2013.01);
(Continued)

(58) Field of Classification Search
CPC .............. F01N 3/0222; B01D 39/2068; B01D 46/2418; B01D 46/2451; B01D 46/247
See application file for complete search history.

(56) References Cited

U.S. PATENT DOCUMENTS

2011/0229684 A1     9/2011   Naruse et al.
2011/0230335 A1*    9/2011   Yamada .............. C04B 35/6263
                                                              502/100
(Continued)

FOREIGN PATENT DOCUMENTS

EP        2 380 647 B1      6/2014
JP        2014-200741 A1   10/2014
(Continued)

OTHER PUBLICATIONS

U.S. Appl. No. 15/704,380, filed Sep. 17. 2017, Kazuya Mori.
German Office Action (Application No. 10 2017 008 765.2) dated Apr. 17, 2018.

*Primary Examiner* — Amber R Orlando
(74) *Attorney, Agent, or Firm* — Burr & Brown, PLLC

(57) ABSTRACT

The plugged honeycomb structure includes a plurality of honeycomb segments, a bonding layer, and plugging portions which plug open ends of cells of each honeycomb segment, and in the honeycomb segment, at least two types of cells having different sectional shapes are formed to constitute predetermined repeated arrangement patterns, and a ratio of a value R2s obtained by dividing an average sectional area $S2_{in}$ of inflow cells by an average sectional area $S2_{out}$ of outflow cells in a partial rim circumferential wall cell region is in a range of 1.7 times or more and 2.0 times or less to a value R1s obtained by dividing an average sectional area $S1_{in}$ of the inflow cells by an average sectional area $S1_{out}$ of the outflow cells in a whole rim partition wall cell region.

7 Claims, 8 Drawing Sheets

(52) U.S. Cl.
    CPC .. *B01D 2046/2492* (2013.01); *B01D 2279/30* (2013.01); *F01N 3/0222* (2013.01); *F01N 2260/06* (2013.01); *F01N 2260/18* (2013.01); *F01N 2330/30* (2013.01); *F01N 2330/32* (2013.01); *F01N 2330/34* (2013.01)

(56) References Cited

U.S. PATENT DOCUMENTS

| | | |
|---|---|---|
| 2014/0298779 A1 | 10/2014 | Miyairi |
| 2015/0037220 A1* | 2/2015 | Goto ................. B01D 46/2455 422/171 |
| 2015/0037221 A1* | 2/2015 | Shibata ................. F01N 3/0222 422/177 |
| 2015/0037532 A1 | 2/2015 | Shibata et al. |
| 2017/0197168 A1 | 7/2017 | Shibata et al. |

FOREIGN PATENT DOCUMENTS

| | | |
|---|---|---|
| JP | 2015-029939 A1 | 2/2015 |
| WO | 2016/013513 A1 | 1/2016 |

* cited by examiner

PLUGGED HONEYCOMB STRUCTURE

The present application is an application based on JP-2016-200350 filed on Oct. 11, 2016 with the Japan Patent Office, the entire contents of which are incorporated herein by reference.

BACKGROUND OF THE INVENTION

Field of the Invention

The present invention relates to a plugged honeycomb structure, and more particularly, it relates to a plugged honeycomb structure which is capable of inhibiting increase of pressure loss while maintaining isostatic strength.

Description of the Related Art

From the viewpoints of influence on the global environment, and resource saving, improvement of car fuel efficiency has been required in recent years. Consequently, internal combustion engines such as a direct injection type gasoline engine and a diesel engine, which are excellent in heat efficiency, have a tendency to be used as power sources for cars.

On the other hand, these internal combustion engines have the problem of generation of cinders during combustion of fuel. From the viewpoint of the atmospheric environment, there are required countermeasures to remove harmful components included in an exhaust gas and to simultaneously prevent particulate matter (hereinafter referred to as "PM" sometimes) such as soot from being discharged to the atmospheric air.

In particular, regulations on removal of the PM emitted from the diesel engine have a tendency to be worldwide strengthened. Furthermore, attention is attracted to use of a wall flow type exhaust gas purifying filter of a honeycomb structure as a trapping filter (hereinafter referred to as "DPF (a diesel particulate filter)" sometimes) to remove the PM, and various systems have been suggested. The above DPF is usually a structure in which porous partition walls define a plurality of cells forming through channels for a fluid, and the cells are alternately plugged, whereby the porous partition walls forming the cells perform a function of the filter. A pillar-shaped structure in which the porous partition walls define the plurality of cells will be referred to as "a honeycomb structure" sometimes. Furthermore, the honeycomb structure in which open ends of the formed cells are plugged with plugging portions will be referred to as "a plugged honeycomb structure" sometimes. The plugged honeycomb structure is broadly used as a trapping filter such as the DPF. When an exhaust gas containing the particulate matter flows into the plugged honeycomb structure from an inflow end face (a first end face) of the plugged honeycomb structure and when the exhaust gas passes through the partition walls, the particulate matter in the exhaust gas is filtered, and the purified exhaust gas is emitted from an outflow end face (a second end face) of the plugged honeycomb structure.

Heretofore, as to a cell shape of the plugged honeycomb structure, there have been quadrangular cells, hexagonal cells, HAC cells (cells having a combination of an octagonal shape and a quadrangular shape), and the like. In recent years, there have been advanced development of novel plugged honeycomb structures in which variant cells are combined and in which positions to be plugged are contrived (e.g., see Patent Documents 1 and 2). According to such plugged honeycomb structures, while decreasing both of pressure loss in an initial use stage and pressure loss during PM deposition, it is possible to inhibit generation of cracks during PM burning and to deposit more ash and the like in the partition walls.

[Patent Document 1] JP-A-2014-200741
[Patent Document 2] JP-A-2015-029939

SUMMARY OF THE INVENTION

In case of using, as a DPF, a plugged honeycomb structure having a special cell shape as in Patent Document 1 or 2, the plugged honeycomb structure is usually formed in a round pillar shape having a specific size and having, for example, round end faces. As one method of manufacturing the round pillar-shaped plugged honeycomb structure, the following manufacturing method has been suggested. Initially, there are prepared a plurality of honeycomb segments each having partition walls defining special cells and segment circumferential walls covering circumferences of the special cells. Next, the plurality of honeycomb segments are bonded by using a bonding material, to prepare a bonded body of the honeycomb segments (hereinafter referred to as "the honeycomb segment bonded body"). Next, a circumference of the honeycomb segment bonded body is ground into an optional shape, and the circumference is further subjected to a coating treatment, to manufacture the plugged honeycomb structure. The plugged honeycomb structure manufactured by this method will hereinafter be referred to as "the plugged honeycomb structure of a segmented structure" sometimes.

Heretofore, in the plugged honeycomb structure of the segmented structure, it has not especially been considered that there is a problem as to "a cell arrangement" between the honeycomb segments of the honeycomb segment bonded body. For example, when all the cells of the plugged honeycomb structure have the same quadrangular shape, a repeated minimum unit of the cells is one cell. Consequently, in such a plugged honeycomb structure, "the cell arrangement" in the honeycomb segment has not especially been considered to have any problem. However, in the plugged honeycomb structure having such a special cell shape as in Patent Document 1 or 2, it has become clear that a shape of a portion of each honeycomb segment which comes in contact with a segment circumferential wall has a large influence on pressure loss. Furthermore, when shapes of the cells in the above-mentioned portion of each honeycomb segment which comes in contact with the segment circumferential wall are not contrived, increase of the pressure loss of the plugged honeycomb structure becomes conspicuous.

The present invention has been developed in view of these problems of conventional technologies. According to the present invention, there is provided a plugged honeycomb structure which is capable of inhibiting increase of pressure loss while maintaining isostatic strength.

According to the present invention, there is provided a plugged honeycomb structure as follows.

According to a first aspect of the present invention, a plugged honeycomb structure is provided including:

a plurality of prismatic columnar honeycomb segments;

a bonding layer bonding side surfaces of the plurality of honeycomb segments to one another; and plugging portions arranged in open ends of predetermined cells in an inflow end face of each honeycomb segment and arranged in open ends of the residual cells in an outflow end face thereof, wherein each honeycomb segment has porous partition walls arranged to surround a plurality of cells extending from the inflow end face to the outflow end face, and segment circumferential walls arranged at an outermost circumference, in a cross section of the honeycomb segment which is perpendicular to an extending direction of the cells, at least two types of cells having different shapes are formed to constitute predetermined repeated arrangement patterns, the cells including the plugging portions arranged on the side of the inflow end face are defined as outflow cells, and the cells including the plugging portions arranged on the side of the outflow end face are defined as inflow cells, the cells of the honeycomb segment include whole rim partition wall cells and partial rim circumferential wall cells, the whole rim partition wall cells are the cells having whole rims of the cells which are surrounded by the partition walls, the partial rim circumferential wall cells are the cells having rims of the cells which are surrounded by the partition walls and the segment circumferential walls, a shape of the cross section of each partial rim circumferential wall cell which is perpendicular to the cell extending direction includes a shape of at least a part of the whole rim partition wall cell, and when a value obtained by dividing an average sectional area $S1_{in}$ of the inflow cells by an average sectional area $S1_{out}$ of the outflow cells in a region where the whole rim partition wall cells are present is defined as R1s, and a value obtained by dividing an average sectional area $S2_{in}$ of the inflow cells by an average sectional area $S2_{out}$ of the outflow cells in a region where the partial rim circumferential wall cells are present is defined as R2s, a ratio of the R2s to the R1s is in a range of 1.7 times or more and 2.0 times or less.

According to a second aspect of the present invention, the plugged honeycomb structure according to the above first aspect is provided, wherein except for a circumferential region of the honeycomb segment where the partial rim circumferential wall cells are formed, the plugging portions are arranged in the open ends of the cells of the honeycomb segment so that the inflow cells surround the outflow cell.

According to a third aspect of the present invention, the plugged honeycomb structure according to the above first or second aspects is provided, wherein a thickness of the segment circumferential wall of the honeycomb segment is from 0.3 to 1.0 mm.

According to a fourth aspect of the present invention, the plugged honeycomb structure according to any one of the above first to third aspects is provided, wherein a thickness of the bonding layer is from 0.5 to 1.5 mm According to a fifth aspect of the present invention, the plugged honeycomb structure according to any one of the above first to fourth aspects is provided, wherein when the shortest distance in mutual distances between two facing partition walls in the inflow cells is defined as a cell open width, an average value of the cell open widths of the inflow cells is 0.5 mm or more.

According to a sixth aspect of the present invention, the plugged honeycomb structure according to any one of the above first to fifth aspects is provided, wherein the average sectional area $S2_{in}$ of the inflow cells in the region where the partial rim circumferential wall cells are present is 4 mm² or less.

According to a seventh aspect of the present invention, the plugged honeycomb structure according to any one of the above first to sixth aspects is provided, wherein in the region where the whole rim partition wall cells are present, each of the inflow cell and the outflow cell has one type of sectional shape.

A plugged honeycomb structure of the present invention is a so-called plugged honeycomb structure of a segmented structure. Furthermore, the plugged honeycomb structure of the present invention has a constitution in which ratios of an average sectional area of inflow cells to an average sectional area of outflow cells in a region where whole rim partition wall cells are present and a region where partial rim circumferential wall cells are present fall in specific numeric ranges. In other words, as described above, a ratio of R2s to R1s is in a range of 1.7 times or more and 2.0 times or less. Here, R1s has a relation of "R1s=$S1_{in}/S1_{out}$" and R2s has a relation of "R2s=$S2_{in}/S2_{out}$", in which $S1_{in}$ is the average sectional area of the inflow cells in the region where the whole rim partition wall cells are present, $S1_{out}$ is the average sectional area of the outflow cells in the region where the whole rim partition wall cells are present, $S2_{in}$ is the average sectional area of the inflow cells in the region where the partial rim circumferential wall cells are present, and $S2_{out}$ is the average sectional area of the outflow cells in the region where the partial rim circumferential wall cells are present. The plugged honeycomb structure of the present invention is capable of inhibiting increase of pressure loss while maintaining isostatic strength.

DESCRIPTION OF THE PREFERRED EMBODIMENTS

Figure 1:
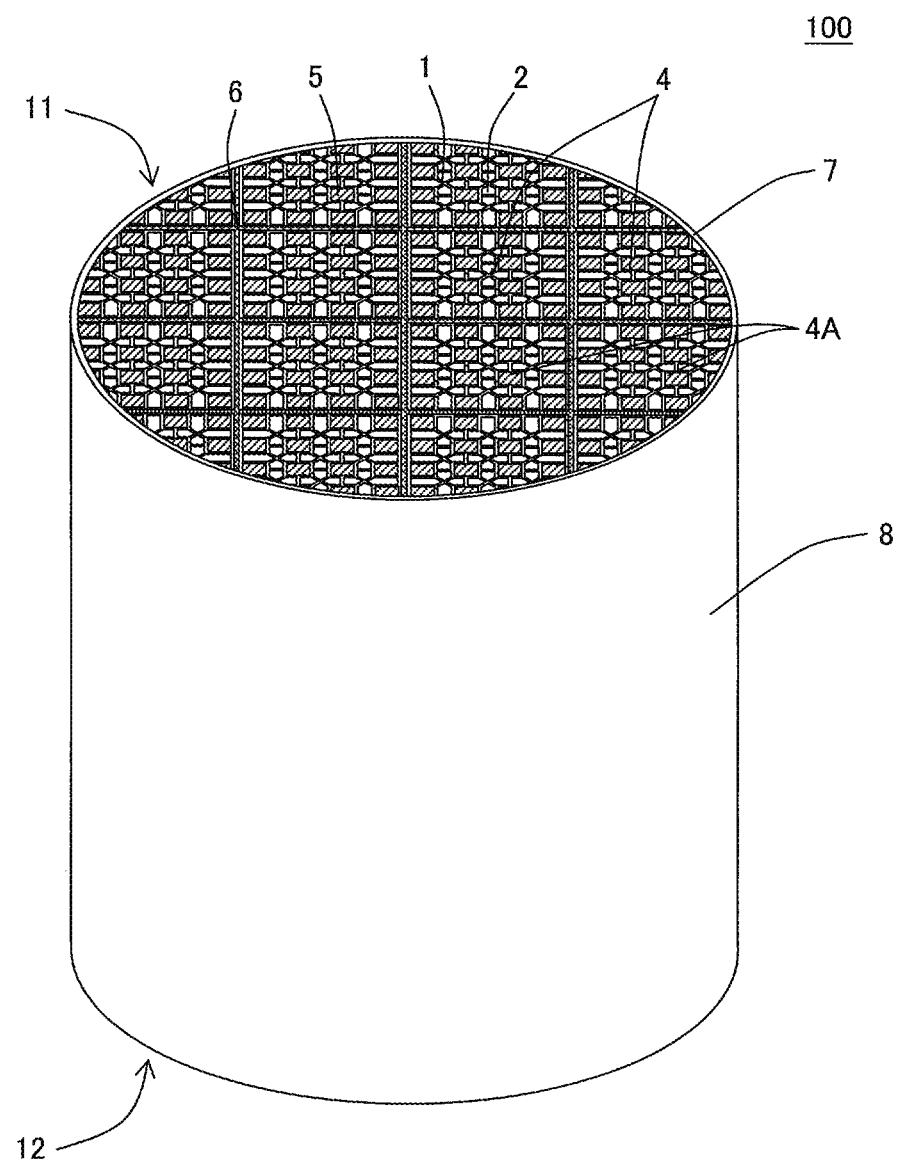
FIG. 1 is a perspective view schematically showing a first embodiment of a plugged honeycomb structure of the present invention and seen from an inflow end face side.

Hereinafter, embodiments of the present invention will be described, but the present invention is not limited to the following embodiments. Therefore, it should be understood that the following embodiments to which changes, improvements and the like are suitably added also fall in the scope of the present invention on the basis of ordinary knowledge of a person skilled in the art without departing from the gist of the present invention.

(1) Plugged Honeycomb Structure:

As shown in FIG. 1 to FIG. 5, a first embodiment of a plugged honeycomb structure of the present invention is a plugged honeycomb structure 100 including a plurality of honeycomb segments 4, a bonding layer 6, and plugging portions 5. The plugged honeycomb structure 100 of the present embodiment is a so-called plugged honeycomb structure of a segmented structure. The plugged honeycomb structure 100 further includes, at its circumference, an outer wall 8 disposed to surround the plurality of honeycomb segments 4. The plugged honeycomb structure 100 of the present embodiment is suitably utilizable as a trapping filter to remove particulate matter included in an exhaust gas.

Figure 2:
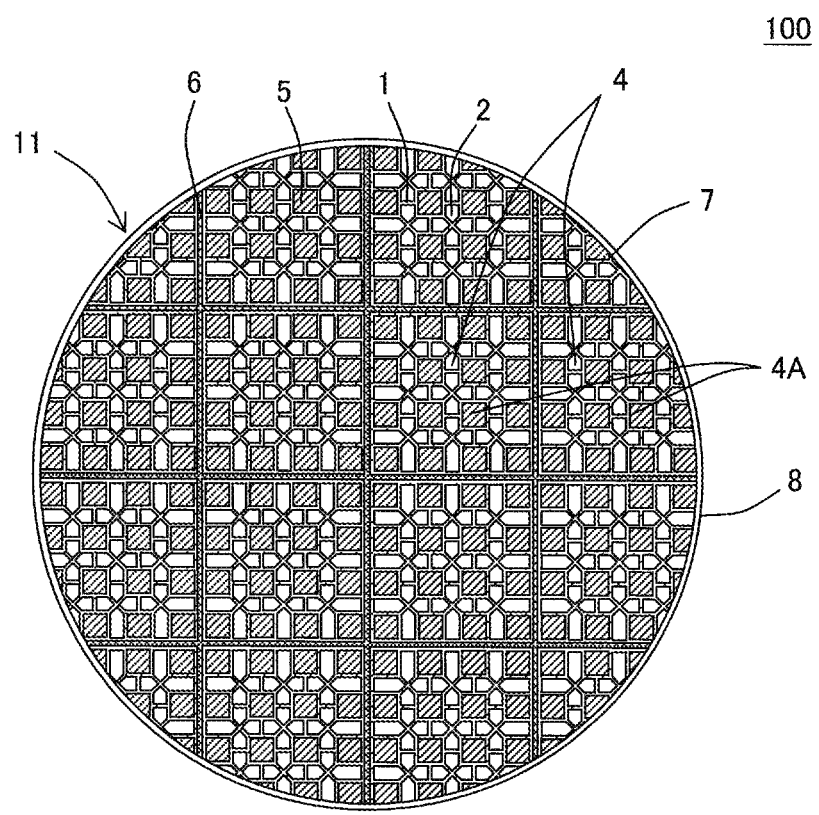
FIG. 2 is a plan view schematically showing the first embodiment of the plugged honeycomb structure of the present invention and seen from the inflow end face side.
Figure 3:
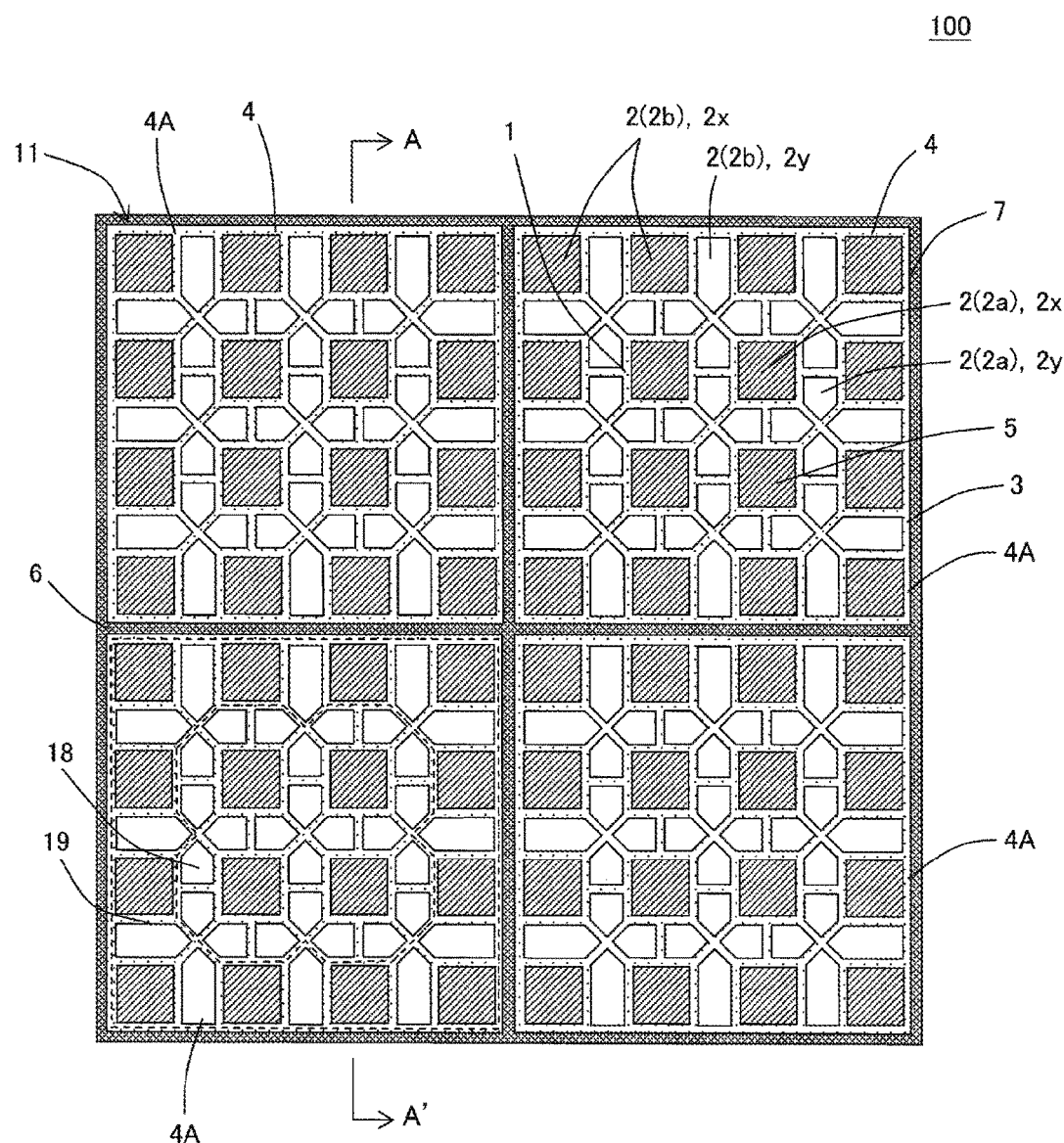
FIG. 3 is an enlarged plan view of an enlarged part of an inflow end face of the plugged honeycomb structure shown in FIG. 1.
Figure 4:
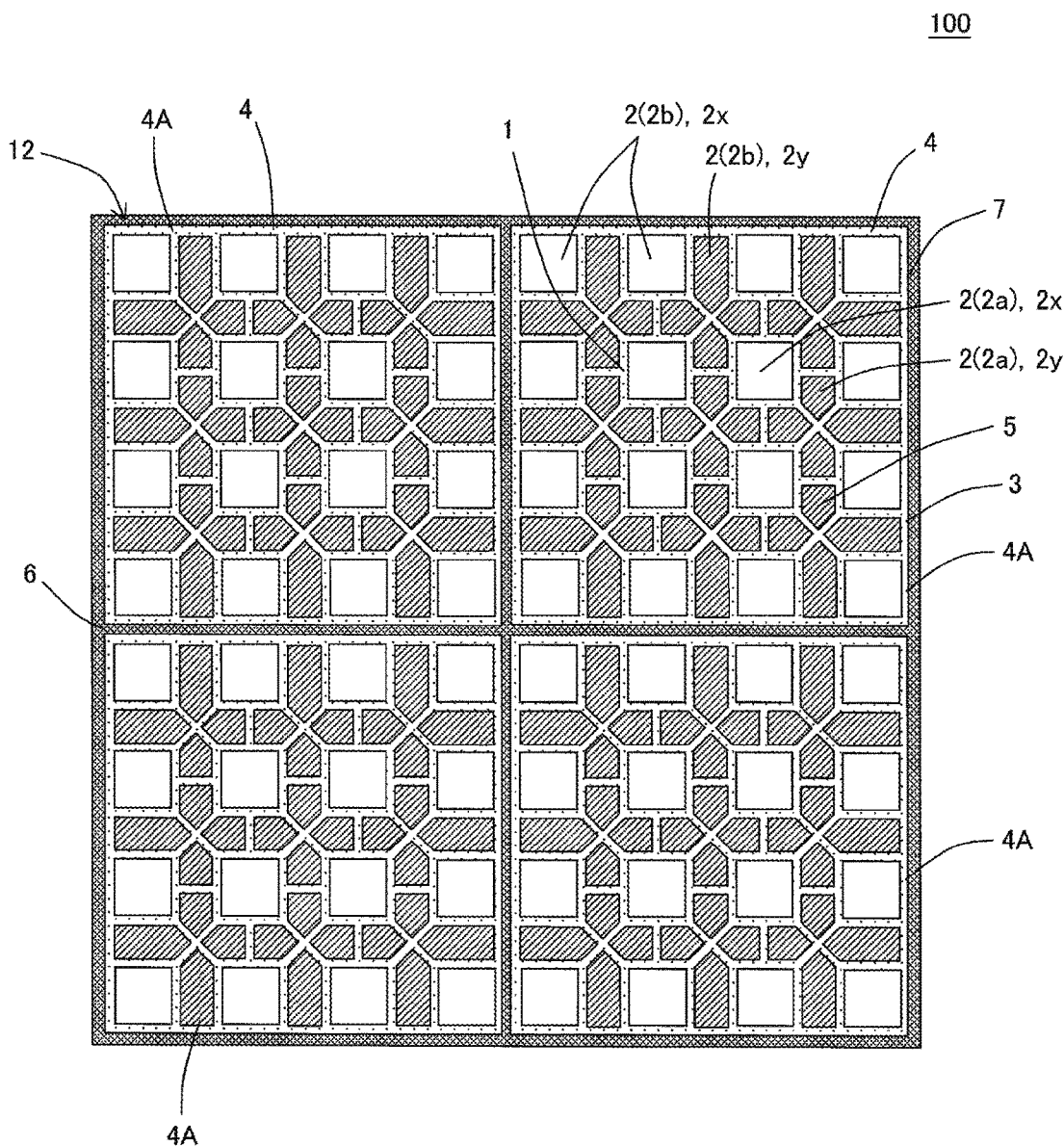
FIG. 4 is an enlarged plan view of an enlarged part of an outflow end face of the plugged honeycomb structure shown in FIG. 1.
Figure 5:
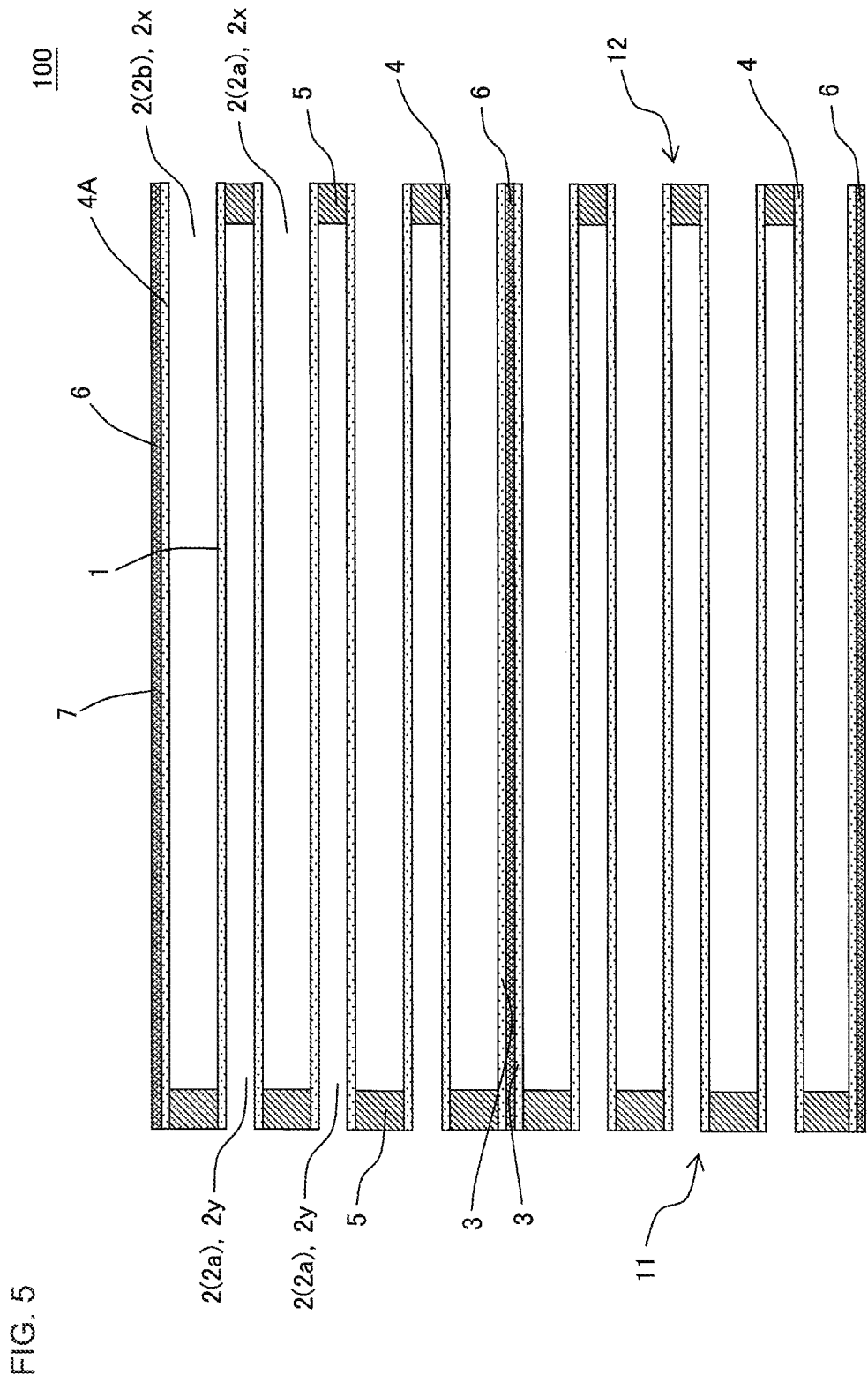
FIG. 5 is a cross-sectional view schematically showing a cross section taken along the A-A' line of FIG. 3.
Figure 6:
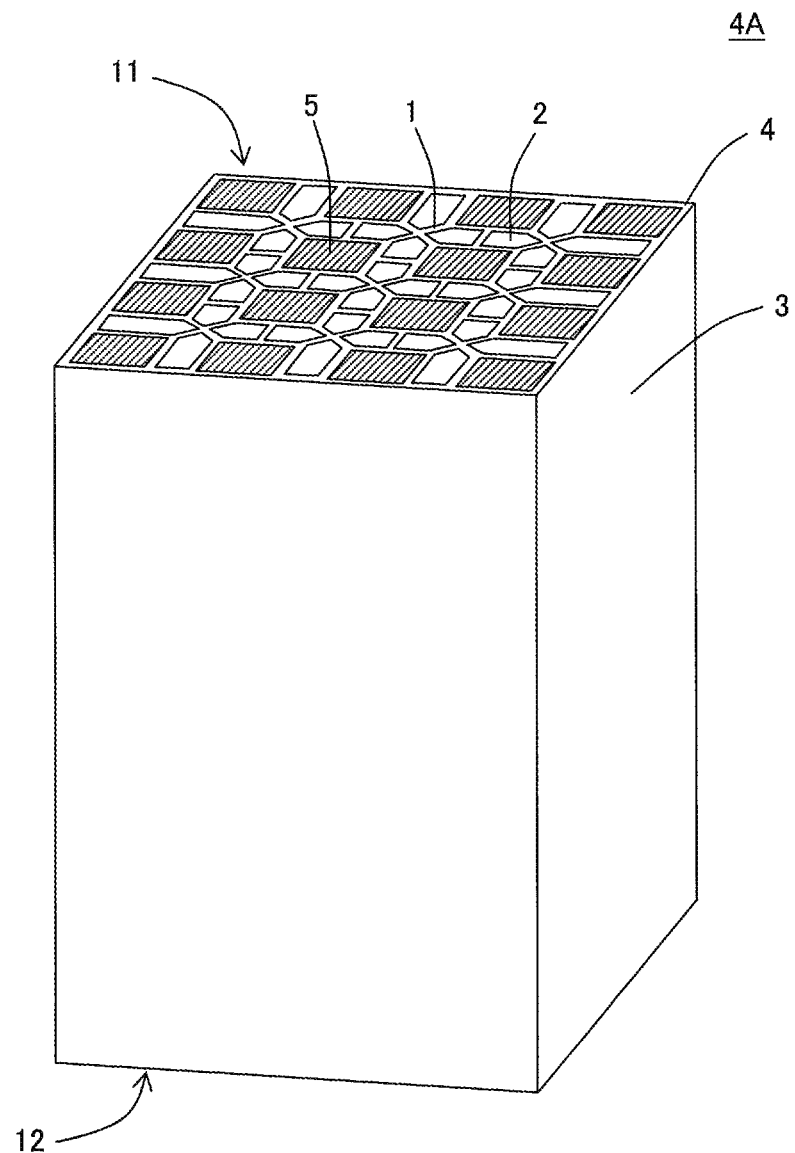
FIG. 6 is a perspective view schematically showing a plugged honeycomb segment for use in the plugged honeycomb structure shown in FIG. 1 and seen from the inflow end face side.
Figure 7:
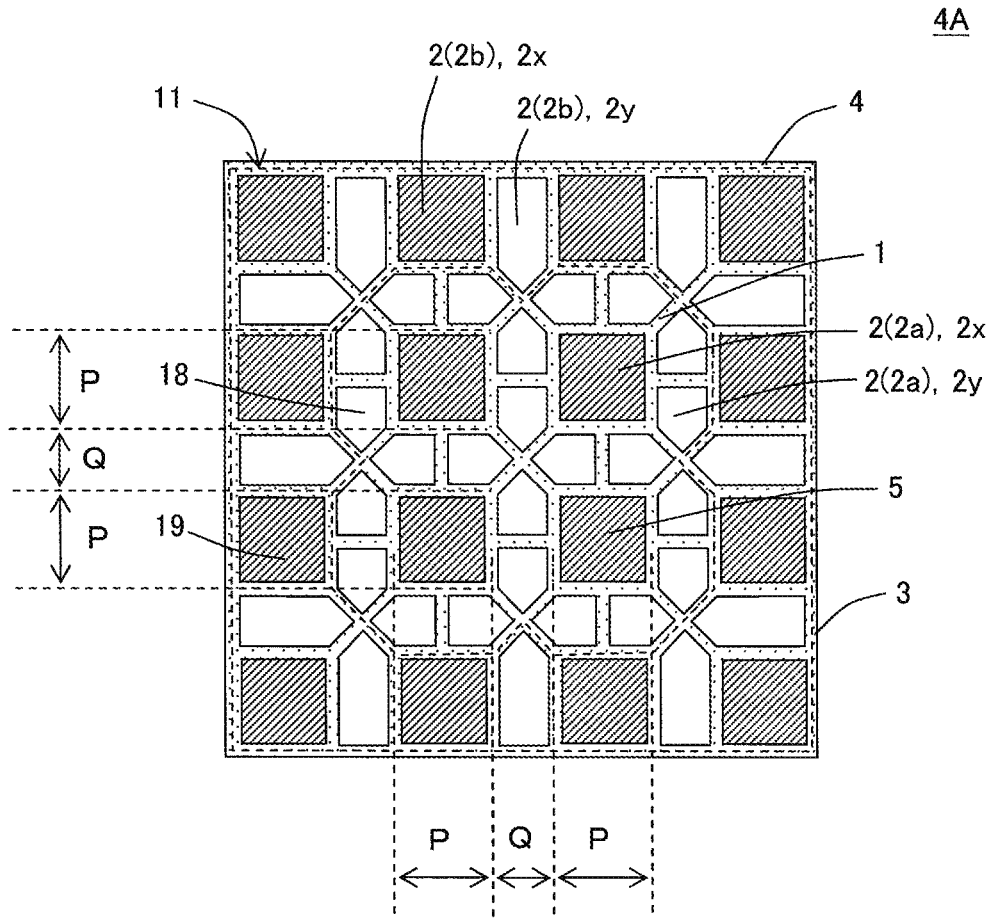
FIG. 7 is a plan view schematically showing the plugged honeycomb segment for use in the plugged honeycomb structure shown in FIG. 1 and seen from the inflow end face side.

Here, FIG. 1 is a perspective view schematically showing the first embodiment of the plugged honeycomb structure of the present invention and seen from an inflow end face side. FIG. 2 is a plan view schematically showing the first embodiment of the plugged honeycomb structure of the present invention and seen from the inflow end face side. FIG. 3 is an enlarged plan view of an enlarged part of an inflow end face of the plugged honeycomb structure shown in FIG. 1. FIG. 4 is an enlarged plan view of an enlarged part of an outflow end face of the plugged honeycomb structure shown in FIG. 1. FIG. 5 is a cross-sectional view schematically showing a cross section taken along the A-A' line of FIG. 3. FIG. 6 is a perspective view schematically showing a plugged honeycomb segment for use in the plugged honeycomb structure shown in FIG. 1 and seen from the inflow end face side. FIG. 7 is a plan view schematically showing the plugged honeycomb segment for use in the plugged honeycomb structure shown in FIG. 1 and seen from the inflow end face side.

As shown in FIG. 6 and FIG. 7, the honeycomb segment 4 has porous partition walls 1 arranged to surround a plurality of cells 2 extending from an inflow end face 11 from which a fluid flows inside to an outflow end face 12 from which the fluid flows outside, and segment circumferential walls 3 arranged at an outermost circumference. As shown in FIG. 1 to FIG. 5, the plugged honeycomb structure 100 includes the plurality of honeycomb segments 4, and side surfaces of the plurality of honeycomb segments 4 are bonded to one another via the bonding layer 6. In the plurality of honeycomb segments 4, the honeycomb segments 4 arranged in a central portion of the plugged honeycomb structure 100 possess "a prismatic columnar shape" in which a direction from the inflow end face 11 toward the outflow end face 12 is an axial direction. On the other hand, in the plurality of honeycomb segments 4, the honeycomb segments 4 arranged in a circumferential portion that comes in contact with the outer wall 8 possess a pillar shape obtained by grinding, along a shape of the outer wall 8, a part of the honeycomb segment 4 formed in a prismatic columnar shape.

The bonding layer 6 is made of a bonding material that bonds side surfaces of a plurality of honeycomb segments 4 to one another. A bonded body obtained by bonding the plurality of honeycomb segments 4 via the bonding layer 6 will be referred to as a honeycomb segment bonded body 7 sometimes.

The plugging portions 5 are arranged in open ends of the cells 2 formed in each honeycomb segment 4 to plug the open ends of the cells 2 on one of an inflow end face 11 side and an outflow end face 12 side. In other words, the plugging portions 5 are arranged in open ends of predetermined cells $2x$ in the inflow end face 11 of the honeycomb segment 4 and open ends of residual cells $2y$ other than the predetermined cells $2x$ in the outflow end face 12. Hereinafter, the cells 2 (i.e., the predetermined cells $2x$ mentioned above) including the plugging portions 5 arranged in the open ends of the cells 2 in the inflow end face 11 of the honeycomb segment 4 will be referred to as "the outflow cells $2x$" sometimes. The cells 2 (i.e., the residual cells $2y$ mentioned above) including the plugging portions 5 arranged in the open ends of the cells 2 in the outflow end face 12 of the honeycomb segment 4 will be referred to as "the inflow cells $2y$" sometimes. The honeycomb segment 4 including the plugging portions 5 arranged in the open ends of the cells 2 will be referred to as a plugged honeycomb segment 4A sometimes.

In a cross section of the honeycomb segment 4 which is perpendicular to an extending direction of the cells 2, at least two types of cells 2 having different shapes are formed to constitute predetermined repeated arrangement patterns. For example, in the honeycomb segment 4 shown in FIG. 6 and FIG. 7, there are formed the cells 2 having two types of different shapes, i.e., the cells 2 (e.g., the outflow cells $2x$) having a quadrangular cell shape and the cells 2 (e.g., the inflow cells $2y$) having a pentagonal cell shape. Each of the above-mentioned "repeated arrangement patterns" is an arrangement pattern constituted of at least one outflow cell $2x$ and at least one inflow cell $2y$, and two or more arrangement patterns are present in one honeycomb segment 4. Hereinafter, the shape of each cell 2 in the cross section perpendicular to the extending direction of the cells 2 will be referred to as "the cell shape", "a sectional shape" or "a shape of the cross section" sometimes. It is to be noted that the numbers of the outflow cells $2x$ and the inflow cells $2y$ formed in each honeycomb segment 4 are not limited to those shown in FIG. 1 to FIG. 7. For example, in FIG. 1 to FIG. 7, the numbers of the outflow cells $2x$ and the inflow cells $2y$ which are little smaller than usual numbers are shown for the sake of convenience in describing the above-mentioned "repeated arrangement patterns".

There are not any special restrictions on the arrangement of the plugging portions 5, i.e., the arrangement of the outflow cells $2x$ and the inflow cells $2y$. However, it is preferable that except for the outflow cells $2x$ positioned at the outermost circumference of the honeycomb segment 4, the plugging portions 5 are arranged in the open ends of the cells 2 of the honeycomb segment 4 so that the inflow cells $2y$ surround the outflow cell $2x$. For example, as in the honeycomb segment 4 shown in FIG. 6 and FIG. 7, it is preferable that the respective plugging portions 5 are arranged so that the inflow cells $2y$ having the pentagonal cell shape surround the outflow cell $2x$ having the quadrangular cell shape. Here, when "the inflow cells $2y$ surround the outflow cell $2x$", it is meant that the cross section perpendicular to the extending direction of the cells 2 has the following constitution. Here, there is described an example where the cell shape of the outflow cells 2x is quadrangular as shown in FIG. 6 and FIG. 7. Initially, the cells are arranged so that one side of the inflow cell 2y is adjacent to each of four sides of one outflow cell 2x. In this case, the cells may be arranged so that one side of each of two or more inflow cells 2y is adjacent to the one side of the one outflow cell 2x. In other words, the cells may be arranged so that one side of one inflow cell 2y is adjacent to a position of a half of one side of the one outflow cell 2x and so that one side of the other inflow cell 2y is adjacent to a position of the other half of the one side of the one outflow cell 2x. Furthermore, all the inflow cells 2y adjacent to the one outflow cell 2x are arranged so that one side of the inflow cell 2y is adjacent to one side of the other inflow cell 2y. The arrangement of the inflow cells 2y in this state means that "the inflow cells 2y surround the outflow cell 2x". A region including the outflow cell 2x positioned at the outermost circumference of the honeycomb segment 4 and the inflow cells 2y arranged around the outflow cell 2x will be referred to as "the circumferential region of the honeycomb segment 4" sometimes.

The cells 2 of the honeycomb segment 4 include whole rim partition wall cells 2a and partial rim circumferential wall cells 2b. The whole rim partition wall cells 2a are the cells 2 having whole rims of the cells 2 which are surrounded by the partition walls 1. The partial rim circumferential wall cells 2b are the cells 2 having rims of the cells 2 which are surrounded by the partition walls 1 and the segment circumferential walls 3. A shape of a cross section of the partial rim circumferential wall cell 2b which is perpendicular to the extending direction of the cells 2 includes a shape of at least a part of the whole rim partition wall cell 2a. A region where the whole rim partition wall cells 2a are present is defined as a whole rim partition wall cell region 18, and a region where the partial rim circumferential wall cells 2b are present is defined as a partial rim circumferential wall cell region 19.

In the plugged honeycomb structure 100 of the present embodiment, an average sectional area of the inflow cells 2y and an average sectional area of the outflow cells 2x in each of the whole rim partition wall cell region 18 and the partial rim circumferential wall cell region 19 are referred to as in the following (A) to (D).

(A) The average sectional area of the inflow cells 2y in the whole rim partition wall cell region 18 is denoted "$S1_{in}$". Hereinafter, the area will be referred to as "the average sectional area $S1_{in}$" sometimes.

(B) The average sectional area of the outflow cells 2x in the whole rim partition wall cell region 18 is denoted "$S1_{out}$". Hereinafter, the area will be referred to as "the average sectional area $S1_{out}$" sometimes.

(C) The average sectional area of the inflow cells 2y in the partial rim circumferential wall cell region 19 is denoted "$S2_{in}$". Hereinafter, the area will be referred to as "the average sectional area $S2_{in}$" sometimes.

(D) The average sectional area of the outflow cells 2x in the partial rim circumferential wall cell region 19 is denoted "$S2_{out}$". Hereinafter, the area will be referred to as "the average sectional area $S2_{out}$" sometimes.

In the plugged honeycomb structure 100 of the present embodiment, a value ($S1_{in}/S1_{out}$) obtained by dividing the average sectional area $S1_{in}$ by the average sectional area $S1_{out}$ is denoted "R1s". A value ($S2_{in}/S2_{out}$) obtained by dividing the average sectional area $S2_{in}$ by the average sectional area $S2_{out}$ is denoted "R2s".

The plugged honeycomb structure 100 of the present embodiment has important characteristics that a ratio of the above-mentioned R2s to R1s is in a range of 1.7 times or more and 2.0 times or less. In other words, the plugged honeycomb structure 100 of the present embodiment has a constitution in which the ratio (i.e., R1s and R2s) of the average sectional area of the inflow cells 2y to the average sectional area of the outflow cells 2x varies in the whole rim partition wall cell region 18 and the partial rim circumferential wall cell region 19. The plugged honeycomb structure 100 having this constitution can produce the effect that it is possible to inhibit increase of pressure loss while maintaining isostatic strength. For example, by employment of the above-mentioned constitution, the open ends of the inflow cells 2y are hard to be clogged with particulate matter such as soot, and it is possible to effectively inhibit the increase of the pressure loss.

In a conventional plugged honeycomb structure of a segmented structure, parts of "repeated arrangement patterns of cells" in each honeycomb segment usually reappear in an incomplete state in a circumferential portion of the honeycomb segment. For example, an appropriate size (e.g., a dimension of each end face) of the honeycomb segment is determined in accordance with a use application or the like. Therefore, in cell shape of the circumferential portion of the honeycomb segment, "the repeated arrangement patterns of the cells" often have an interrupted state. Furthermore, in the plugged honeycomb structure of the segmented structure, it tends to be considered that restrictions on a configuration of each of "the repeated arrangement patterns of the cells" or restrictions on the size of the honeycomb segment are important, and it has not been considered that the cell shape of the circumferential portion of the honeycomb segment is important. The present inventor has found that the cell shape of the circumferential portion of the honeycomb segment, especially the ratio of the average sectional area of the inflow cells to the average sectional area of the outflow cells has a large influence on pressure loss of the plugged honeycomb structure of the segmented structure, to complete the present invention.

In the plugged honeycomb structure 100 of the present embodiment, the above-mentioned ratio of R2s to R1s is adjusted in a range of 1.7 times or more and 2.0 times or less, to inhibit the increase of the pressure loss. The plugged honeycomb structure 100 of the present embodiment does not especially require changes of the whole structure of the honeycomb segment 4, e.g., a thickness of the partition walls 1, a cell density or the like, and hence the structure does not cause any noticeable deterioration of the isostatic strength. Consequently, for example, it is possible to effectively inhibit the increase of the pressure loss of the plugged honeycomb structure while sufficiently acquiring the isostatic strength considered to be required in holding the plugged honeycomb structure in an exhaust gas purifying device.

In the plugged honeycomb structure 100 of the present embodiment, when the ratio of R2s to R1s is smaller than 1.7 times or in excess of 2.0 times, it becomes difficult to inhibit the increase of the pressure loss. It is preferable that the ratio of R2s to R1s is in a range of 1.8 times or more and 1.9 times or less. This constitution is capable of more effectively inhibiting the increase of the pressure loss of the plugged honeycomb structure.

The average sectional area $S1_{in}$ of the inflow cells of the whole rim partition wall cell region is preferably from 0.8 to 3.0 mm² and further preferably from 1.2 to 2.5 mm². The average sectional area $S1_{out}$ of the outflow cells of the whole rim partition wall cell region is preferably from 1.0 to 10.0 mm² and further preferably from 2.0 to 8.0 mm². Thus, the average sectional areas are adjusted in such numeric ranges as described above, so that it is possible to effectively inhibit the increase of the pressure loss while more effectively inhibiting noticeable deterioration of the isostatic strength.

The average sectional area $S1_{in}$ of the inflow cells, the average sectional area $S1_{out}$ of the outflow cells, the average sectional area $S2_{in}$ of the inflow cells and the average sectional area $S2_{out}$ of the outflow cells are obtainable by, for example, the following methods. Initially, each honeycomb segment is cut in the axial direction and a cross section of the cut honeycomb segment is imaged. Next, a sectional area of each cell in an image obtained by the imaging is measured, and the average sectional areas of the inflow cells and outflow cells of the whole rim partition wall cell region as well as the average sectional areas of the inflow cells and outflow cells of the partial rim circumferential wall cell region are calculated. Alternatively, when the sectional areas of the respective cells are constant in the cell extending direction, measurement of areas of the open ends of the respective cells may be performed in place of the measurement of the sectional areas of the respective cells. For example, the inflow end face and outflow end face of the honeycomb segment are imaged, and in the obtained image, the areas of the open ends of the respective cells are measured. Then, on the basis of the measured areas of the open ends of the respective cells, average values are calculated as to the inflow cells and outflow cells of the whole rim partition wall cell region as well as the inflow cells and outflow cells of the partial rim circumferential wall cell region. The calculated average values are the average sectional areas of the respective cells. Furthermore, an average value of cell open widths is also obtainable from the image obtained by a method similar to the above-mentioned method. Specifically, as to the image obtained by the imaging, the open widths of the respective cells are measured and an average value of the open widths is calculated, whereby the average value of the cell open widths is obtainable.

There are not any special restrictions on the whole shape of the plugged honeycomb structure 100. For example, the whole shape of the plugged honeycomb structure 100 shown in FIG. 1 is a round pillar shape including the inflow end face 11 and the outflow end face 12 which are round. Additionally, although not shown in the drawing, the whole shape of the plugged honeycomb structure may be a pillar shape including the inflow end face and outflow end face which have a substantially round shape such as an elliptic shape, a racetrack shape or an oblong shape. Alternatively, the whole shape of the plugged honeycomb structure may be a prismatic columnar shape including the inflow end face and outflow end face which have a polygonal shape such as a quadrangular shape or a hexagonal shape.

There are not any special restrictions on a material constituting the honeycomb segment, but from the viewpoints of strength, heat resistance, durability and the like, it is preferable that a main component is any oxide or non-oxide ceramic, a metal or the like. Specifically, it is considered that examples of ceramic include cordierite, mullite, alumina, spinel, silicon carbide, silicon nitride, and aluminum titanate. It is considered that examples of the metal include a Fe—Cr—Al based metal and metal silicon. It is preferable that the main component is one or at least two selected from these materials. From the viewpoints of high strength, high heat resistance and the like, it is especially preferable that the main component is one or at least two selected from the group consisting of alumina, mullite, aluminum titanate, cordierite, silicon carbide and silicon nitride. Furthermore, from the viewpoints of high thermal conductivity, high heat resistance and the like, silicon carbide or a silicon-silicon carbide composite material is especially suitable. Here, "the main component" means a component constituting 50 mass % or more, preferably 70 mass % or more, and further preferably 80 mass % or more of the honeycomb segment.

There are not any special restrictions on a material of the plugging portions. It is preferable that the material of the plugging portions includes one or at least two selected from the group consisting of various ceramics and the metal which are the above-mentioned examples of the suitable material of the honeycomb segment.

In the plugged honeycomb structure of the present embodiment, a plurality of honeycomb segments (more specifically, a plurality of plugged honeycomb segments) are bonded to one another via the bonding layer. According to this constitution, thermal stress applied to the plugged honeycomb structure is dispersible, and it is possible to effectively prevent generation of cracks due to local temperature rise.

There are not any special restrictions on a size of the honeycomb segment. However, when the size of one honeycomb segment is excessively large, the effect of preventing the generation of the cracks might not sufficiently be exerted. On the other hand, when the size of the one honeycomb segment is excessively small, an operation of bonding the honeycomb segments via the bonding layer might become laborious.

There are not any special restrictions on a shape of the honeycomb segment. An example of the shape of the honeycomb segment is a prismatic columnar shape in which a sectional shape perpendicular to the axial direction of the honeycomb segment is a polygonal shape such as a quadrangular shape or a hexagonal shape. It is to be noted that the honeycomb segment disposed at the outermost circumference of the plugged honeycomb structure may be obtained by processing such as grinding of a part of the prismatic columnar shape in accordance with the whole shape of the plugged honeycomb structure.

As shown in FIG. 1 to FIG. 5, in the plugged honeycomb structure 100 of the present embodiment, predetermined repeated arrangement patterns of each honeycomb segment 4 are formed by the whole rim partition wall cells 2a. The whole rim partition wall cells 2a include the inflow cells 2y and the outflow cells 2x, and as to the inflow cell 2y constituting the repeated arrangement patterns, a sectional shape of the inflow cell 2y which is perpendicular to a central axis direction is apparently substantially pentagonal. Furthermore, as to the outflow cell 2x forming the repeated arrangement patterns, a sectional shape of the outflow cell 2x which is perpendicular to the central axis direction is apparently substantially square. The above "sectional shape" is a shape appearing in a cross section of each cell 2 when the cell is cut with a plane perpendicular to the central axis direction, and is a shape of a portion surrounded by the partition walls 1 forming the cell 2. Furthermore, the honeycomb segment 4 of the plugged honeycomb structure 100 of the present embodiment has the repeated arrangement patterns of the cells arranged so that eight inflow cells 2y having a substantially pentagonal sectional shape surround the outflow cell 2x having a substantially square sectional shape. According to this constitution, in the plugged honeycomb structure 100 of the present embodiment, differently from the conventional plugged honeycomb structure, a filtration area of the honeycomb segment 4 can increase in case of use of the structure as a filter. Consequently, it is possible to decrease the pressure loss during PM deposition. Furthermore, in the honeycomb segment 4 having this constitution, the outflow cells 2x are not adjacent to each other, and the whole periphery of the outflow cell 2x is surrounded by the inflow cells 2y. In consequence, it is possible to increase an open frontal area of the outflow cell 2x, and the number of the outflow cells 2x can be smaller than the number of the inflow cells 2y, so that it is possible to decrease the pressure loss in an initial stage of the use of the plugged honeycomb structure 100.

As shown in FIG. 1 to FIG. 5, the inflow cell 2y having a substantially pentagonal sectional shape is not regularly pentagonal, but preferably has a so-called home base shape in which inner angles are, for example, 90°, 135°, 90°, 90°, and 135° clockwise from one apex. According to this constitution, four inflow cells 2y are adjacently formed so that corner portions of the respective home base shapes on point sides gather. In a portion where the corner portions of the respective home base shapes of the four inflow cells 2y on the point sides gather, two partition walls 1 are perpendicular to each other, a heat capacity of the partition walls 1 in the portion where the corner portions gather is highly maintainable, and the thermal stress during the PM burning can be relaxed.

Figure 8:
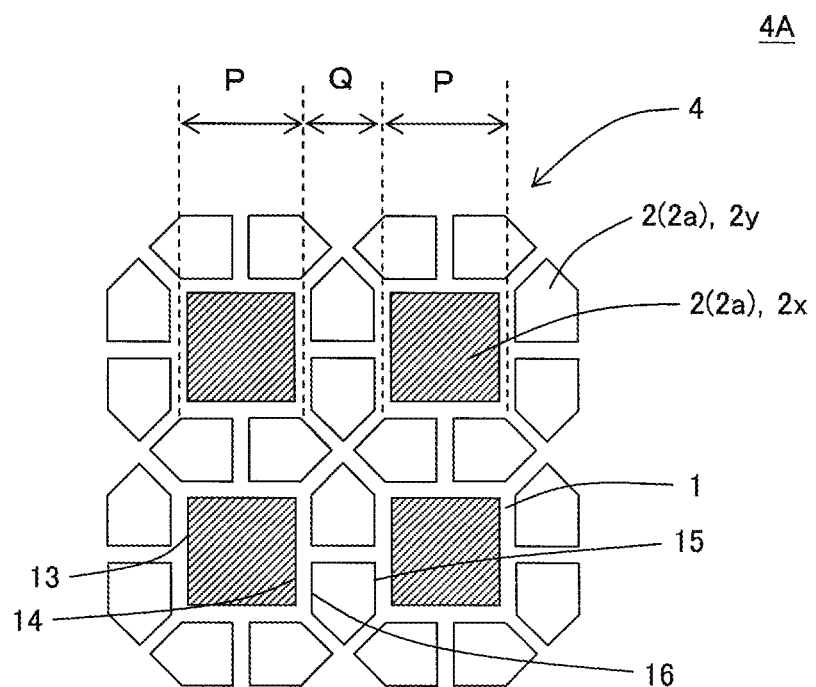
FIG. 8 is a schematic partial enlarged view of the first embodiment of the plugged honeycomb structure of the present invention seen from the inflow end face side.

As shown in FIG. 8, it is preferable that a distance P that is a distance between the partition wall 1 forming a first side 13 of the outflow cell 2x and the partition wall 1 forming a second side 14 facing the first side 13 of the outflow cell 2x is in excess of 0.8 mm and smaller than 3.8 mm. The distance P indicates the shortest distance connecting the center of the partition wall 1 forming the first side 13 in a thickness direction to the center of the partition wall 1 forming the facing second side 14 in the thickness direction. On the other hand, as shown in FIG. 8, a distance between the partition wall 1 forming a third side 15 of the inflow cell 2y which is substantially parallel and adjacent to one side of the outflow cell 2x and the partition wall 1 forming a fourth side 16 facing the third side 15 of the inflow cell 2y is defined as a distance Q. It is preferable that a ratio of the distance Q to the distance P is in a range of 0.2 or more and smaller than 1.6. The distance Q indicates the shortest distance connecting the center of the partition wall 1 forming the third side 15 in the thickness direction to the center of the partition wall 1 forming the facing fourth side 16 in the thickness direction. A relation between the distance P and the distance Q is adjusted in the above range, whereby the initial pressure loss and the pressure loss during the PM deposition preferably decrease with good balance. FIG. 8 is a schematic partial enlarged view of the first embodiment of the plugged honeycomb structure of the present invention seen from the inflow end face side.

A thickness of the segment circumferential wall of the honeycomb segment is preferably from 0.3 to 1.0 mm, further preferably from 0.3 to 0.8 mm, and especially preferably from 0.4 to 0.6 mm. When the thickness of the segment circumferential wall of the honeycomb segment is smaller than 0.3 mm, the strength of the honeycomb segment unfavorably deteriorates. When the thickness of the segment circumferential wall of the honeycomb segment is in excess of 1.0 mm, the pressure loss unfavorably increases, and thermal shock resistance unfavorably deteriorates.

A thickness of the bonding layer is preferably from 0.5 to 1.5 mm, further preferably from 0.7 to 1.3 mm, and especially preferably from 0.8 to 1.2 mm. When the thickness of the bonding layer is smaller than 0.5 mm, the thermal shock resistance unfavorably deteriorates. When the thickness of the bonding layer is in excess of 1.5 mm, the pressure loss unfavorably increases.

In the plugged honeycomb structure of the present embodiment, it is preferable that each of the inflow cell and the outflow cell has one sectional shape in the whole rim partition wall cell region. In other words, it is preferable that all the inflow cells of the whole rim partition wall cell region have the same sectional shape. Furthermore, it is preferable that all the outflow cells of the whole rim partition wall cell region have the same sectional shape. When the plugged honeycomb structure having this constitution satisfies the respective conditions hitherto described, it is possible to suitably inhibit the increase of the pressure loss due to deposition of incombustible particulate matter while suitably maintain the isostatic strength or the thermal shock resistance.

Furthermore, in the plugged honeycomb structure of the present embodiment, it is preferable that the whole rim partition wall cells include two or more types of cells having different sectional shapes. In the plugged honeycomb structure 100 shown in FIG. 1 to FIG. 5, the outflow cells 2x having a substantially square sectional shape are the whole rim partition wall cells 2a having a first sectional shape, and the inflow cells 2y having a substantially pentagonal sectional shape are the whole rim partition wall cells 2a having a second sectional shape. According to this constitution, at least two types of cells having different sectional shapes suitably form predetermined repeated arrangement patterns. It is to be noted that when the cell sectional shape is polygonal, each corner portion of the polygonal shape may possess a curved shape having a radius. For example, the substantially square shape generically refers to a square sectional shape and a curved square sectional shape in which at least one corner portion of the square shape is formed in the curved shape having the radius. Similarly, the substantially pentagonal shape generically refers to a pentagonal sectional shape and a curved pentagonal sectional shape in which at least one corner portion of the pentagonal shape is formed into the curved shape having the radius.

When the shortest distance in mutual distances between two facing partition walls 1 in the inflow cells 2y is the cell open width, it is preferable that the average value of the cell open widths of the inflow cells 2y is 0.5 mm or more. This constitution can inhibit the cells from being clogged with PM such as the soot. The average value of the cell open widths of the inflow cells is further preferably 0.8 mm or more and especially preferably 1.0 mm or more.

There are not any special restrictions on the thickness of the partition walls 1. For example, the thickness of the partition wall 1 present between one side of one cell 2 and one side of the other cell 2 substantially parallel and adjacent to the one cell 2 is preferably from 0.07 to 0.51 mm, further preferably from 0.10 to 0.46 mm, and especially preferably from 0.12 to 0.38 mm. When the thickness of the partition walls 1 is smaller than 0.07 mm, formation of the honeycomb segment 4 unfavorably becomes difficult. On the other hand, when the thickness of the partition walls 1 is larger than 0.51 mm, the thickness is unfavorable from the viewpoints of acquisition of the filtration area and decrease of the pressure loss.

Furthermore, one of suitable examples of the plugged honeycomb structure of the present embodiment includes each honeycomb segment constituted as follows. In the inflow cells 2y, a geometric surface area (GSA) is preferably from 10 to 30 $cm^2/cm^3$ and further preferably from 12 to 18 $cm^2/cm^3$. Here, the above-mentioned "geometric surface area (GSA)" is a value (S/V) obtained by dividing a total inner surface area (S) of the inflow cells 2$y$ by a total volume (V) of the honeycomb segment. In general, a thickness of PM deposited in the partition walls can decrease as the filtration area of the filter increases, and hence it is possible to minimize the pressure loss of the plugged honeycomb structure by adjustment of the geometric surface area (GSA) in the above-mentioned numeric range. Therefore, when the geometric surface area (GSA) of the inflow cells 2$y$ is smaller than 10 $cm^2/cm^3$, the pressure loss during the PM deposition unfavorably increases. On the other hand, when the GSA is larger than 30 $cm^2/cm^3$, the initial pressure loss unfavorably increases.

In the plugged honeycomb structure of the present embodiment, a cell sectional open frontal area of the inflow cell 2$y$ has a ratio of preferably from 20 to 70% and further preferably from 25 to 65%. When the ratio of the cell sectional open frontal area of the inflow cell 2$y$ is smaller than 20%, the initial pressure loss unfavorably increases. Furthermore, when the ratio is larger than 70%, a filtration rate increases to deteriorate a PM trapping efficiency, and further the strength of the partition walls 1 unfavorably runs short. Here, "the ratio of the cell sectional open frontal area of the inflow cell 2$y$" means a ratio of "a sum of sectional areas of the inflow cells 2$y$" to a total of "a sectional area of all the partition walls 1 formed in the plugged honeycomb structure" and "a sum of sectional areas of all the cells 2" in a cross section of the plugged honeycomb structure which is vertical to the central axis direction.

In the plugged honeycomb structure of the present embodiment, a hydraulic diameter of each of the whole rim partition wall cells 2$a$ is preferably from 0.5 to 3.5 mm and further preferably from 0.8 to 2.5 mm. When the hydraulic diameter of each of the whole rim partition wall cells 2$a$ is smaller than 0.5 mm, the initial pressure loss unfavorably increases. On the other hand, when the hydraulic diameter of each of the whole rim partition wall cells 2$a$ is larger than 3.5 mm, a contact area of the exhaust gas with the partition walls 1 decreases, and a purification efficiency unfavorably deteriorates. Here, the hydraulic diameter of each of the whole rim partition wall cells 2$a$ is a value calculated in accordance with 4×(sectional area)/(circumferential length) based on the sectional area and circumferential length of each whole rim partition wall cell 2$a$. The sectional area of the whole rim partition wall cell 2$a$ indicates an area of the shape (the sectional shape) of the cell appearing in the cross section of the plugged honeycomb structure which is vertical to the central axis direction, and the circumferential length of the cell indicates a length of a circumference of the sectional shape of the cell (a length of a closed line surrounding the cross section).

In view of trade-off among the initial pressure loss, the pressure loss during the PM deposition, and the trapping efficiency, it is preferable that a more preferable configuration of the plugged honeycomb structure is as follows. It is preferable to simultaneously satisfy the conditions that the geometric surface area (GSA) of the inflow cells 2$y$ is from 10 to 30 $cm^2/cm^3$ and that the ratio of the cell sectional open frontal area of each inflow cell 2$y$ is from 20 to 70% and that the hydraulic diameter of each of the plurality of cells 2 is from 0.5 to 3.5 mm. Furthermore, it is further preferable to simultaneously satisfy the conditions that the geometric surface area (GSA) of the inflow cells 2$y$ is from 12 to 18 $cm^2/cm^3$ and that the ratio of the cell sectional open frontal area of each inflow cell 2$y$ is from 25 to 65% and that the hydraulic diameter of each of the plurality of cells 2 is from 0.8 to 2.5 mm.

In the plugged honeycomb structure of the present embodiment, a catalyst may be loaded onto the partition walls 1 forming the plurality of cells 2. The loading of the catalyst onto the partition walls 1 means coating of the surfaces of the partition walls 1 and inner walls of pores formed in the partition walls 1 with the catalyst. Examples of a type of catalyst include an SCR catalyst (zeolite, titania and vanadium), and a three-way catalyst containing at least two noble metals selected from the group consisting of Pt, Rh and Pd and at least one selected from the group consisting of alumina, ceria and zirconia. Thus, the catalyst is loaded, whereby it is possible to detoxify $NO_x$, CO, HC and the like included in the exhaust gas emitted from a direct injection type gasoline engine, the diesel engine or the like, and it is also possible to easily burn and remove the PM deposited on the surfaces of the partition walls 1 by a catalytic function.

In the plugged honeycomb structure of the present embodiment, there are not any special restrictions on a method of loading such a catalyst as described above, and a method usually performed by the person skilled in the art is employable. Specifically, an example of the method is a method of wash-coating the structure with a catalyst slurry and then performing drying and firing.

(2) Manufacturing Method of Plugged Honeycomb Structure:

There are not any special restrictions on a manufacturing method of the plugged honeycomb structure of the present embodiment shown in FIG. 1 to FIG. 5, and the plugged honeycomb structure can be manufactured by, for example, such a method as described below. Initially, a plastic kneaded material to prepare the honeycomb segments is prepared. The kneaded material to prepare the honeycomb segments can be prepared by suitably adding an additive such as a binder and water to a material selected as raw material powder from the above-mentioned suitable material of the honeycomb segments.

Next, the kneaded material obtained in this manner is extruded to prepare a prismatic columnar honeycomb formed body having partition walls arranged to surround a plurality of cells, and segment circumferential walls arranged at an outermost circumference. A plurality of honeycomb formed bodies are prepared.

Each obtained honeycomb formed body is dried with, for example, microwaves and hot air, and open ends of the cells are plugged with a material similar to the material used in preparing the honeycomb formed body, to prepare plugging portions. The honeycomb formed body may further be dried after the plugging portions are prepared.

Next, the honeycomb formed body including the prepared plugging portions is fired, to obtain the plugged honeycomb segment. A firing temperature and a firing atmosphere vary with the raw materials, and the person skilled in the art can select the firing temperature and the firing atmosphere which are optimum for the selected material. Next, a plurality of plugged honeycomb segments are bonded to one another by use of a bonding material, and dried to harden. Afterward, a circumference is processed into a desirable shape, whereby the plugged honeycomb structure of the segmented structure is obtainable. As the bonding material, a ceramic material pasted by adding a liquid medium such as water thereto is usable. Furthermore, a processed surface obtained by processing the circumference of a bonded body of the plugged honeycomb segments has a state where the cells are exposed, and hence the outer wall 8 may be formed by coating the processed surface with a circumference coating material as shown in FIG. 1. As a material of the circumference coating material, for example, the same material as in the bonding material is usable.

EXAMPLES

Comparative Example 1

As a ceramic raw material, a mixed raw material was prepared by mixing silicon carbide (SiC) powder and metal silicon (Si) powder at a mass ratio of 80:20. To this mixed raw material, hydroxypropyl methylcellulose was added as a binder, a water absorbable resin was added as a pore former, and water was also added, to prepare a forming raw material. The obtained forming raw material was kneaded by using a kneader, to obtain a kneaded material.

Figure 9:
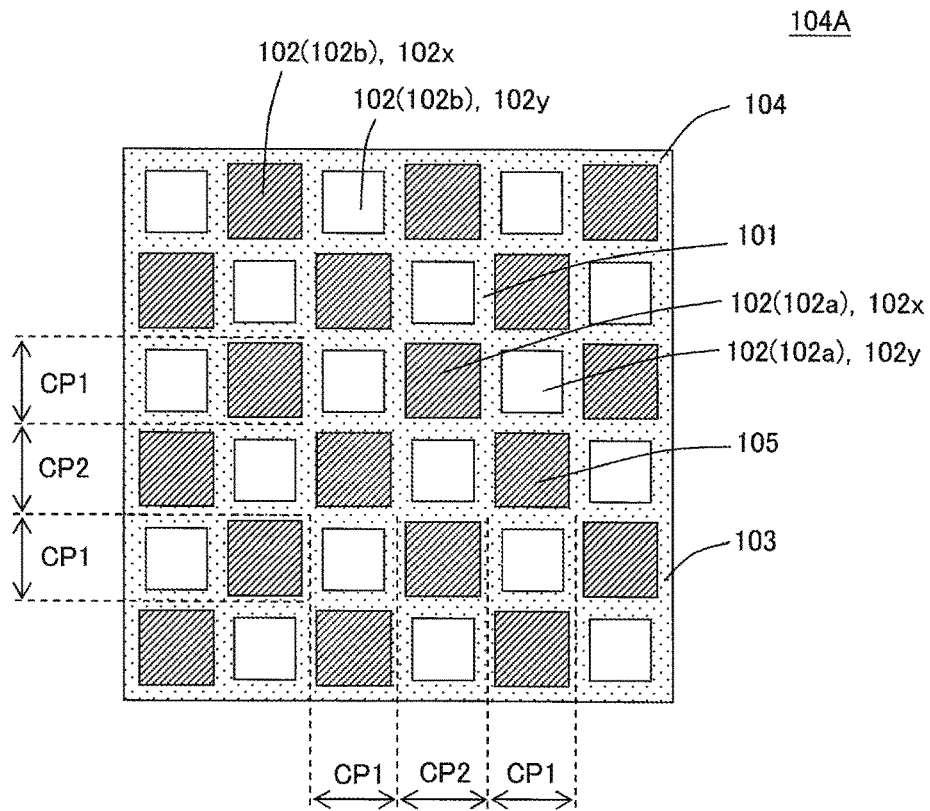
FIG. 9 is a plan view schematically showing a plugged honeycomb segment for use in a plugged honeycomb structure of Comparative Example 1 and seen from an inflow end face side.

Next, the obtained kneaded material was formed by using a vacuum extruder, to prepare 16 quadrangular prismatic columnar honeycomb segments each having repeated arrangement patterns similar to those of a plugged honeycomb segment 104A shown in FIG. 9. Here, FIG. 9 is a plan view schematically showing the plugged honeycomb segment for use in a plugged honeycomb structure of Comparative Example 1 and seen from an inflow end face side.

In FIG. 9, reference numeral 104 indicates a honeycomb segment and reference numeral 105 indicates a plugging portion. The honeycomb segment 104 has porous partition walls 101 arranged to surround a plurality of cells 102, and segment circumferential walls 103 arranged at an outermost circumference. The plugging portions 105 are arranged to alternately plug open ends of the respective cells 102 in an inflow end face and an outflow end face of the honeycomb segment 104. In the plugged honeycomb segment 104A, a sectional shape of each cell 102 is square, and outflow cells 102x are different from inflow cells 102y in cell size. Specifically, the size of each outflow cell 102x is relatively larger than the size of each inflow cell 102y. Furthermore, in the plugged honeycomb segment 104A, each of the sectional shapes of the inflow cell 102y and the outflow cell 102x is the same in a whole rim partition wall cell 102a and a partial rim circumferential wall cell 102b.

Next, the obtained honeycomb segments were dried by high frequency induction heating, and then dried by using a hot air drier at 120° C. for 2 hours. Furthermore, during the drying, the honeycomb segment was disposed so that its outflow end face perpendicularly faced downward, and the honeycomb segment was dried.

Plugging portions were formed in the dried honeycomb segments. Initially, an inflow end face of each honeycomb segment was masked. Next, a masked end portion (the end portion on the side of the inflow end face) was immersed into a plugging slurry to charge the plugging slurry into open ends of cells (outflow cells) which were not masked. Thus, the plugging portions were formed on the inflow end face side of the honeycomb segment. Afterward, an outflow end face of the dried honeycomb segment was similarly masked and immersed, to form plugging portions also in inflow cells.

Then, each honeycomb segment including the formed plugging portions was degreased and fired to obtain a plugged honeycomb segment. As to degreasing conditions, the degreasing was performed at 550° C. for 3 hours, and as to firing conditions, the firing was performed at 1450° C. under argon atmosphere for 2 hours. During the firing, the honeycomb segment including the formed plugging portions was disposed so that its outflow end face perpendicularly faced downward, and the honeycomb segment was fired.

As described above, the plugged honeycomb segments for use in manufacturing the plugged honeycomb structure of Comparative Example 1 were prepared. Similarly to the plugged honeycomb segment shown in FIG. 9, each prepared plugged honeycomb segment had a constitution in which the outflow cells 102x having a relatively large sectional shape and the inflow cells 102y having a relatively small sectional shape were alternately arranged via the partition walls 101. Design of the plugged honeycomb segment having the above-mentioned constitution is defined as "design C". Table 1 shows the design of the plugged honeycomb segment used in Comparative Example 1 in a column of "design".

In each prepared plugged honeycomb segment, a cross section perpendicular to an axial direction was square, and a length of one side of this square shape (a segment size) was 37.9 mm. Furthermore, a length of the honeycomb segment in the axial direction was 152.4 mm. Furthermore, in the plugged honeycomb segment, a distance CP1 shown in FIG. 9 was 1.3 mm, a distance CP2 was 1.6 mm, and a thickness of the partition walls was 0.15 mm. Table 1 shows values of "the partition wall thickness (mm)", "the distance CP1 (mm)" and "the distance CP2 (mm)" Furthermore, in the prepared plugged honeycomb segment, a thickness of a segment circumferential wall was 0.5 mm. Table 1 shows the thickness of the segment circumferential wall in a column of "segment circumferential wall thickness (mm)". It is to be noted that the plugged honeycomb structure of Comparative Example 1 has a constitution in which each of the distance CP1 and the distance CP2 has the same length in a longitudinal direction and a lateral direction as shown in FIG. 9.

As to each prepared plugged honeycomb segment, cell open widths of the inflow cells were measured. An average value of the cell open widths of the inflow cells was 1.5 mm. On the other hand, as to the prepared plugged honeycomb segment, an average sectional area of the inflow cells was obtained. Table 1 shows the results. The average sectional area of the inflow cells was 1 mm$^2$. Table 2 shows the result in a column of "average sectional area S2$_{in}$ of inflow cells in a partial rim circumferential wall cell region". Furthermore, in the plugged honeycomb segment prepared in Comparative Example 1, cell structures were the same in the partial rim circumferential wall cell region and a whole rim partition wall cell region, and hence R2s was 1.0 time as large as R1s (i.e., the same value). Table 2 shows a ratio (a magnification) of R2s to R1s in a column of "ratio (times) of R2s to R1s".

The 16 fired plugged honeycomb segments were monolithically bonded by using a bonding material. The bonding material included inorganic particles and an inorganic adhesive as main components, and included an organic binder, a surfactant, a foamable resin, water and others as subcomponents. As the inorganic particles, plate-shaped particles were used, and as the inorganic adhesive, colloidal silica (silica sol) was used. As the plate-shaped particles, mica was used. A circumference of a honeycomb segment bonded body obtained by monolithically bonding the 16 honeycomb segments was ground and processed in a round pillar shape, and its circumferential surface was coated with a coating material, to obtain the plugged honeycomb structure of Comparative Example 1. In the plugged honeycomb structure of Comparative Example 1, a diameter of each end face was 143.8 mm. The coating material included ceramic powder, water and a bonding agent. A width of a bonding layer made of the bonding material was 1 mm. Table 1 shows the width of the bonding layer in a column of "bonding layer thickness (mm)".

TABLE 1

|  | Design | Partition wall thickness [mm] | P or CP1 [mm] | Q or CP2 [mm] | Cell open width (average value) of inflow cells [mm] | Bonding layer thickness [mm] | Segment circumferential wall thickness [mm] |
|---|---|---|---|---|---|---|---|
| Comparative Example 1 | Design C | 0.15 | 1.3 | 1.6 | 1.5 | 1.0 | 0.5 |
| Comparative Example 2 | Design A | 0.2 | 3.3 | 0.7 | 0.5 | 1.0 | 0.5 |
| Comparative Example 3 | Design A | 0.2 | 1.7 | 2.5 | 2.3 | 1.0 | 0.5 |
| Comparative Example 4 | Design B | 0.2 | 3.6 | 0.4 | 0.2 | 1.0 | 0.5 |
| Example 1 | Design B | 0.2 | 3.4 | 0.6 | 0.4 | 1.0 | 0.5 |
| Example 2 | Design B | 0.2 | 3.3 | 0.7 | 0.5 | 1.0 | 0.5 |
| Example 3 | Design B | 0.2 | 2.6 | 1.5 | 1.3 | 1.0 | 0.5 |
| Example 4 | Design B | 0.2 | 1.7 | 2.5 | 2.3 | 1.0 | 0.5 |
| Comparative Example 5 | Design B | 0.2 | 1.6 | 2.6 | 2.4 | 1.0 | 0.5 |
| Example 5 | Design B | 0.2 | 2.6 | 1.5 | 1.3 | 1.5 | 0.5 |
| Example 6 | Design B | 0.2 | 2.6 | 1.5 | 1.3 | 1.6 | 0.5 |
| Example 7 | Design B | 0.2 | 2.6 | 1.5 | 1.3 | 0.5 | 0.5 |
| Example 8 | Design B | 0.2 | 2.6 | 1.5 | 1.3 | 0.4 | 0.5 |
| Example 9 | Design B | 0.2 | 2.6 | 1.5 | 1.3 | 1.0 | 1.0 |
| Example 10 | Design B | 0.2 | 2.6 | 1.5 | 1.3 | 1.0 | 1.1 |
| Example 11 | Design B | 0.2 | 2.6 | 1.5 | 1.3 | 1.0 | 0.3 |
| Example 12 | Design B | 0.2 | 2.6 | 1.5 | 1.3 | 1.0 | 0.2 |

TABLE 2

|  | Average sectional area $S1_{in}$ of inflow cells in whole rim partition wall cell region [mm²] | Average sectional area $S1_{out}$ of outflow cells in whole rim partition wall cell region [mm²] | Average sectional area $S2_{in}$ of inflow cells in partial rim circumferential wall cell region [mm²] | Average sectional area $S2_{out}$ of outflow cells in partial rim circumferential wall cell region [mm²] | Ratio of R2s to R1s [times] |
|---|---|---|---|---|---|
| Comparative Example 1 | 1.0 | 0.7 | 1.0 | 0.7 | 1.0 |
| Comparative Example 2 | 0.9 | 9.6 | 0.8 | 9.6 | 0.9 |
| Comparative Example 3 | 3.0 | 2.3 | 1.5 | 2.3 | 0.5 |
| Comparative Example 4 | 0.3 | 11.6 | 0.6 | 11.6 | 2.1 |
| Example 1 | 0.7 | 10.2 | 1.4 | 10.2 | 2.0 |
| Example 2 | 0.9 | 9.6 | 1.7 | 9.6 | 2.0 |
| Example 3 | 1.9 | 5.8 | 3.6 | 5.8 | 1.9 |
| Example 4 | 3.0 | 2.3 | 5.0 | 2.3 | 1.7 |
| Comparative Example 5 | 3.1 | 2.0 | 5.0 | 2.0 | 1.6 |
| Example 5 | 1.9 | 5.8 | 3.6 | 5.8 | 1.9 |
| Example 6 | 1.9 | 5.8 | 3.6 | 5.8 | 1.9 |
| Example 7 | 1.9 | 5.8 | 3.6 | 5.8 | 1.9 |
| Example 8 | 1.9 | 5.8 | 3.6 | 5.8 | 1.9 |
| Example 9 | 1.9 | 5.8 | 3.6 | 5.8 | 1.9 |
| Example 10 | 1.9 | 5.8 | 3.6 | 5.8 | 1.9 |
| Example 11 | 1.9 | 5.8 | 3.6 | 5.8 | 1.9 |
| Example 12 | 1.9 | 5.8 | 3.6 | 5.8 | 1.9 |

Comparative Example 2

Figure 10:
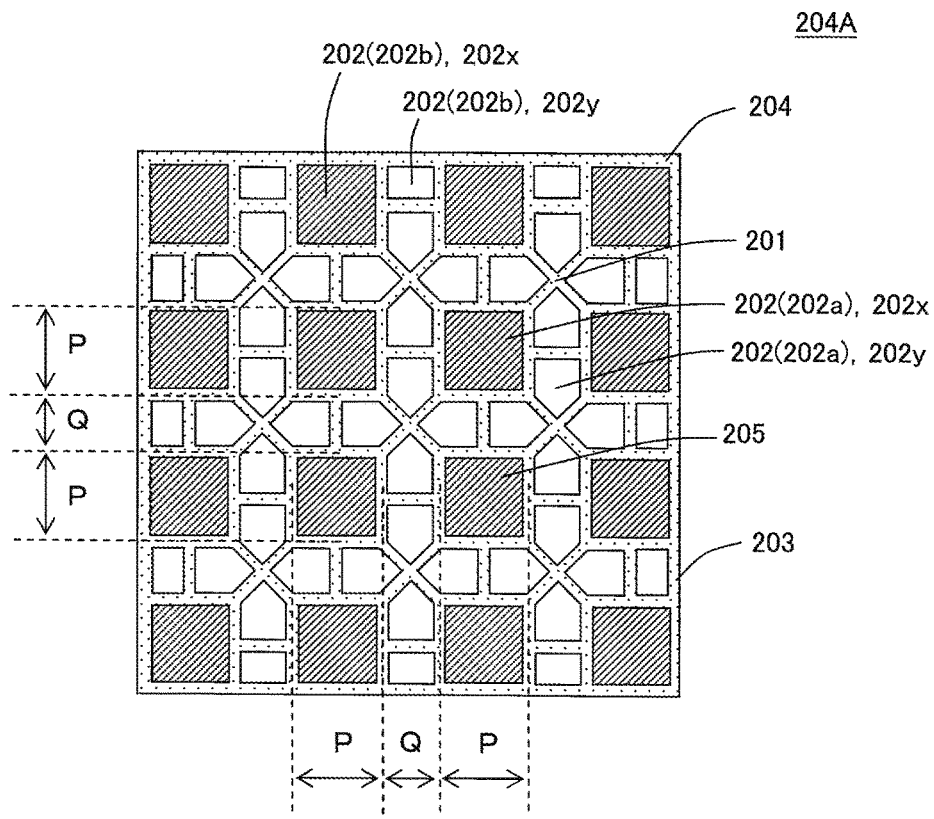
FIG. 10 is a plan view schematically showing a plugged honeycomb segment for use in plugged honeycomb structures of Comparative Examples 2 and 3 and seen from an inflow end face side.

A kneaded material was prepared by a method similar to Comparative Example 1, and the obtained kneaded material was formed by using a vacuum extruder, to prepare 16 quadrangular prismatic columnar honeycomb segments each having repeated arrangement patterns similar to those of a plugged honeycomb segment 204A shown in FIG. 10. It is to be noted that "the repeated arrangement patterns similar to those of the plugged honeycomb segment 204A shown in FIG. 10" are repeated arrangement patterns each including 8 inflow cells 202y having a pentagonal sectional shape and arranged to surround an outflow cell 202x having a square sectional shape.

Next, the obtained honeycomb segments were dried by a method similar to Comparative Example 1. Next, in each dried honeycomb segment, plugging portions were formed to obtain the repeated arrangement patterns similar to those of the plugged honeycomb segment 204A shown in FIG. 10. Design of each plugged honeycomb segment including the inflow cells and outflow cells having the above-mentioned constitution is defined as "design A". Table 1 shows the design of the plugged honeycomb segment used in Comparative Example 2 in a column of "design".

Each prepared honeycomb segment had "the repeated arrangement patterns" each including the outflow cells 202$x$ having the square sectional shape and the inflow cells 202$y$ having the pentagonal sectional shape in the same manner as in the plugged honeycomb segment 204A shown in FIG. 10. Then, in a circumferential portion of the plugged honeycomb segment 204A, two types of square and rectangular partial rim circumferential wall cells 202$b$ and pentagonal whole rim partition wall cells 202$a$ were formed. In the circumferential portion of the plugged honeycomb segment 204A, parts of the above-mentioned repeated arrangement patterns were partially reproduced by the two types of square and rectangular partial rim circumferential wall cells 202$b$ and the pentagonal whole rim partition wall cells 202$a$.

In each prepared plugged honeycomb segment, a cross section perpendicular to an axial direction was square, and a length of one side of this square shape (a segment size) was 37.9 mm. Furthermore, a length of the honeycomb segment in the axial direction was 152.4 mm. Furthermore, in the plugged honeycomb segment, a distance P shown in FIG. 10 was 3.3 mm, a distance Q was 0.7 mm, and a thickness of partition walls was 0.2 mm. Table 1 shows values of "the partition wall thickness (mm)", "the distance P (mm)" and "the distance Q (mm)". Table 1 shows "the distance P (mm)" in a column of "P or CP1 (mm)" Table 1 shows "the distance Q (mm)" in a column of "Q or CP2 (mm)". On the other hand, in the prepared plugged honeycomb segment, a thickness of a segment circumferential wall was 0.5 mm. Table 1 shows the thickness of the segment circumferential wall in a column of "segment circumferential wall thickness (mm)". It is to be noted that the plugged honeycomb structure of Comparative Example 2 has a constitution in which each of the distance P and the distance Q has the same length in a longitudinal direction and a lateral direction as shown in FIG. 10.

As to each prepared plugged honeycomb segment, cell open widths of the inflow cells were measured. An average value of the cell open widths of the inflow cells was 0.5 mm. On the other hand, as to the prepared plugged honeycomb segment, sectional areas of the respective cells were measured to obtain "an average sectional area S2$_{in}$ of the inflow cells in a partial rim circumferential wall cell region". The average sectional area S2$_{in}$ of the inflow cells in the partial rim circumferential wall cell region was 0.8 mm$^2$. Table 2 shows the result.

Furthermore, from values of measured sectional areas, there were also obtained "an average sectional area S1$_{in}$ of the inflow cells in a whole rim partition wall cell region", "an average sectional area S1$_{out}$ of the outflow cells in the whole rim partition wall cell region", and "an average sectional area S2$_{out}$ of the outflow cells in the partial rim circumferential wall cell region". Table 2 shows the results. Then, there were obtained "a value (R1s=S1$_{in}$/S1$_{out}$) obtained by dividing the average sectional area S1$_{in}$ by the average sectional area S1$_{out}$" and "a value (R2s=S2$_{in}$/S2$_{out}$) obtained by dividing the average sectional area S2$_{in}$ by the average sectional area S2$_{out}$". In the prepared plugged honeycomb segment, R2s was 0.9 times as large as R1s.

The 16 fired plugged honeycomb segments were monolithically bonded by using a bonding material. The bonding material similar to a bonding material used in Comparative Example 1 was used. A width of a bonding layer was 1 mm.

Comparative Example 3

In Comparative Example 3, the procedure of Comparative Example 2 was repeated except that a constitution of each honeycomb segment was changed as shown in Table 1 and Table 2, to prepare a plugged honeycomb structure. In the constitution of the honeycomb segment, there were changed "a distance F", "a distance Q", "a cell open width (an average value) of inflow cells" and respective values shown in Table 2.

Example 1

A kneaded material was obtained by a method similar to Comparative Example 1, and the obtained kneaded material was formed by using a vacuum extruder, to prepare 16 quadrangular prismatic columnar honeycomb segments each having repeated arrangement patterns similar to those of the plugged honeycomb segment 4A shown in FIG. 7. It is to be noted that in each of "the repeated arrangement patterns similar to those of the plugged honeycomb segment 4A shown in FIG. 7", eight inflow cells having a pentagonal sectional shape are arranged to surround an outflow cell having a square sectional shape.

Each prepared honeycomb segment had "the repeated arrangement patterns" including outflow cells 2$x$ having a square sectional shape and inflow cells 2$y$ having a pentagonal sectional shape in the same manner as in the plugged honeycomb segment 4A shown in FIG. 7. The repeated arrangement patterns were positioned in a whole rim partition wall cell region 18 of a honeycomb segment 4. In a partial rim circumferential wall cell region 19 of the honeycomb segment 4, the square outflow cells 2$x$ and the pentagonal inflow cells 2$y$ were formed to constitute arrangement patterns which partially simulate parts of the above-mentioned repeated arrangement patterns. However, the inflow cells 2$y$ (i.e., partial rim circumferential wall cells 2$b$) formed in the partial rim circumferential wall cell region 19 had a coupled-like sectional shape of two inflow cells 2$y$ in the pentagonal inflow cells 2$y$ constituting the repeated arrangement patterns.

Next, the obtained honeycomb segments were dried by a method similar to Comparative Example 1. Next, plugging portions were formed in each dried honeycomb segment to constitute the repeated arrangement patterns similar to those of the plugged honeycomb segment 4A shown in FIG. 7. Design of the plugged honeycomb segment including the inflow cells and outflow cells having the above-mentioned constitutions is defined as "design B". Table 1 shows the design of the plugged honeycomb segment used in Example 1 in a column of "design".

In each prepared plugged honeycomb segment, a cross section perpendicular to an axial direction was square, and a length of one side of this square shape (a segment size) was 37.9 mm. Furthermore, a length of the honeycomb segment in the axial direction was 152.4 mm. Furthermore, in the plugged honeycomb segment, a distance P shown in FIG. 7 was 3.4 mm, a distance Q was 0.6 mm, and a thickness of partition walls was 0.2 mm. Table 1 shows values of "the partition wall thickness (mm)", "the distance P (mm)" and "the distance Q (mm)". Furthermore, in the prepared plugged honeycomb segment, a thickness of a segment circumferential wall was 0.5 mm. Table 1 shows the thickness of the segment circumferential wall in a column of "segment circumferential wall thickness (mm)". Furthermore, the plugged honeycomb structure of Example 1 has a constitution in which each of the distance P and the distance Q has the same length in a longitudinal direction and a lateral direction as shown in FIG. 7.

As to each prepared plugged honeycomb segment, cell open widths of the inflow cells were measured. An average value of the cell open widths of the inflow cells was 0.4 mm. On the other hand, as to the prepared plugged honeycomb segment, sectional areas of the respective cells were measured to obtain "an average sectional area $S2_{in}$ of the inflow cells in the partial rim circumferential wall cell region". The average sectional area $S2_{in}$ of the inflow cells in the partial rim circumferential wall cell region was 1.4 mm². Table 2 shows the result.

Furthermore, from values of measured sectional areas, there were also obtained "an average sectional area $S1_{in}$ of the inflow cells in the whole rim partition wall cell region", "an average sectional area $S1_{out}$ of the outflow cells in the whole rim partition wall cell region", and "an average sectional area $S2_{out}$ of the outflow cells in the partial rim circumferential wall cell region". Table 2 shows the results. Then, there were obtained "a value ($R1s=S1_{in}/S1_{out}$) obtained by dividing the average sectional area $S1_{in}$ by the average sectional area $S1_{out}$" and "a value ($R2s=S2_{in}/S2_{out}$) obtained by dividing the average sectional area $S2_{in}$ by the average sectional area $S2_{out}$". In the prepared plugged honeycomb segment, R2s was 2.0 times as large as R1s.

The 16 fired plugged honeycomb segments were monolithically bonded by using a bonding material. The bonding material similar to a bonding material used in Comparative Example 1 was used. A width of a bonding layer was 1 mm.

Examples 2 to 12

In Examples 2 to 12, the procedure of Example 1 was repeated except that a constitution of each honeycomb segment was changed as shown in Table 1 and Table 2 and except that a width of a bonding layer was changed as shown in Table 1, to prepare plugged honeycomb structures. Table 1 shows "a distance P", "a distance Q", "a cell open width (an average value) of inflow cells", "a thickness of a bonding layer" and "a segment circumferential wall thickness" in each of the plugged honeycomb structures of Examples 2 to 12.

Comparative Examples 4 and 5

In Comparative Examples 4 and 5, the procedure of Example 1 was repeated except that a constitution of each honeycomb segment was changed as shown in Table 1 and Table 2, to prepare plugged honeycomb structures. In the constitution of the honeycomb segment, there were changed "a distance P", "a distance Q", "a cell open width (an average value) of inflow cells" and respective values shown in Table 2.

As to each of the plugged honeycomb structures of Examples 1 to 12 and Comparative Examples 1 to 5, pressure loss, isostatic strength and thermal shock resistance were evaluated by the following methods. Table 3 shows the evaluation results.

TABLE 3

|  | Pressure loss | Isostatic strength | Thermal shock resistance |
|---|---|---|---|
| Comparative Example 1 | Reference value | A | B |
| Comparative Example 2 | D | A | A |
| Comparative Example 3 | D | A | A |
| Comparative Example 4 | D | B | B |
| Example 1 | C | B | B |
| Example 2 | B | B | B |
| Example 3 | A | B | B |
| Example 4 | B | C | B |
| Comparative Example 5 | D | C | B |
| Example 5 | B | B | A |
| Example 6 | C | B | A |
| Example 7 | A | B | B |
| Example 8 | A | B | C |
| Example 9 | B | A | B |
| Example 10 | C | A | B |
| Example 11 | A | B | B |
| Example 12 | A | C | B |

(Pressure Loss)

Initially, masses of plugged honeycomb structures of Examples 1 to 12 and Comparative Examples 1 to 5 were measured, respectively. Next, the plugged honeycomb structure of Comparative Example 1 was mounted in an exhaust system of a car including a mounted diesel engine for the car which had a displacement of 2.0 L. Then, a running test of the car was carried out to trap ash in an exhaust gas by the plugged honeycomb structure, and changes of pressure loss of the plugged honeycomb structure were measured. Then, when a value of the pressure loss increased as much as 3 kPa from initial pressure loss, the mass of the plugged honeycomb structure was measured. Then, a mass increase from the mass of the plugged honeycomb structure which was measured before the start of the measurement was calculated. The calculated mass increase was divided by a volume of the plugged honeycomb structure, to obtain an amount of ash deposited per unit volume (L) when the pressure loss increased as much as 3 kPa. Also as to each of the plugged honeycomb structures of Examples 1 to 12 and Comparative Examples 2 to 5, the amount of the deposited ash was obtained in the same manner as in the above-mentioned method. Evaluation of the ash deposition pressure loss was carried out in accordance with the following evaluation standards.

Evaluation A: A ratio of the amount of the deposited ash was +30% or more to the amount of the deposited ash of Comparative Example 1.

Evaluation B: The ratio of the amount of the deposited ash was +20% or more and smaller than +30% to the amount of the deposited ash of Comparative Example 1.

Evaluation C: The ratio of the amount of the deposited ash was +10% or more and smaller than +20% to the amount of the deposited ash of Comparative Example 1.

Evaluation D: The ratio of the amount of the deposited ash was smaller than +10% to the amount of the deposited ash of Comparative Example 1.

(Isostatic Strength)

Measurement of the isostatic strength was carried out on the basis of an isostatic breakdown strength test stipulated in JASO Standard M505-87 of a car standard issued by the society of Automotive Engineers of Japan. In the isostatic breakdown strength test, the plugged honeycomb structure was placed in a rubber tubular container, the container was closed with a lid of an aluminum plate, and isotropic pressurizing compression was performed in water. In other words, the isostatic breakdown strength test was a test to simulate compressive load weighting when a circumferential surface of the plugged honeycomb structure was grasped in a can member. The isostatic strength measured by this isostatic breakdown strength test is indicated with a pressurizing pressure value (MPa) when the plugged honeycomb structure breaks down. The evaluation of the isostatic strength was carried out in accordance with the following evaluation standards.

Evaluation A: The isostatic strength was 3.0 MPa or more.
Evaluation B: The isostatic strength was 2.0 MPa or more and smaller than 3.0 MPa.
Evaluation C: The isostatic strength was 1.0 MPa or more and smaller than 2.0 MPa.
Evaluation D: The isostatic strength was smaller than 1.0 MPa.

(Thermal Shock Resistance)

The evaluation of a thermal shock resistance by an electric furnace spalling test was carried out on the basis of a method stipulated in JASO Standard M505-87 of a car standard issued by the society of Automotive Engineers of Japan. Specifically, the plugged honeycomb structure at room temperature was initially disposed in an electric furnace kept at a temperature higher as much as a predetermined temperature than room temperature and held in this state for 20 minutes. Afterward, the plugged honeycomb structure was taken out onto a refractory brick. In this state, the plugged honeycomb structure was left to stand naturally for 15 minutes or more, and cooled until the temperature reached room temperature, and it was checked whether or not damages such as cracks were generated in the plugged honeycomb structure. This operation was repeated until damages such as the cracks were generated in the plugged honeycomb structure. Furthermore, the temperature in the electric furnace was raised every 25° C. every time the above operation was repeated. The temperature in the electric furnace in the operation just before the operation in which it was confirmed that damages such as the cracks were generated in the plugged honeycomb structure was defined as a safe temperature of the plugged honeycomb structure. The evaluation of the thermal shock resistance was carried out in accordance with the following evaluation standards.

Evaluation A: The safe temperature was 500° C. or more.
Evaluation B: The safe temperature was 400° C. or more and lower than 500° C.
Evaluation C: The safe temperature was 300° C. or more and lower than 400° C.
Evaluation D: The safe temperature was lower than 300° C.

(Result)

In the plugged honeycomb structures of Examples 1 to 12, a ratio of R2s was in a range of 1.7 times or more and 2.0 times or less. In the plugged honeycomb structures of Examples 1 to 12, a ratio of an amount of deposited ash when pressure loss increased as much as 3 kPa was +10% or more to a reference value of the plugged honeycomb structure of Comparative Example 1. Even when the amount of the deposited ash increased, the pressure loss was hard to increase. In other words, the plugged honeycomb structures of Examples 1 to 12 inhibited the increase of the pressure loss during ash deposition. Furthermore, the plugged honeycomb structures of Examples 1 to 12 had suitable evaluation results such as evaluation C and higher evaluations also in evaluations of isostatic strength and thermal shock resistance.

On the other hand, in the plugged honeycomb structures of Comparative Examples 2 to 5, a ratio of an amount of deposited ash when pressure loss increased as much as 3 kPa was smaller than +10% to the reference value of the plugged honeycomb structure of Comparative Example 1, and an effect of suppressing the pressure loss during ash deposition was not sufficiently obtainable. In particular, by comparison of evaluation results of the plugged honeycomb structures of Examples 1 to 4 and Comparative Examples 2 to 5, it has been confirmed that in the examples where the ratio of R2s is adjusted in a range of 1.7 times or more and 2.0 times or less, even when the amount of the deposited ash increases, the pressure loss is hard to increase. It has been confirmed that in the examples where the ratio of R2s is smaller than 1.7 times or in excess of 2.0 times, the pressure loss easily increases as the amount of the deposited ash increases.

By comparison of the evaluation results of the plugged honeycomb structures of Examples 1 to 4, it has been seen that when an average value of cell open widths of inflow cells is adjusted in a range of 0.5 mm or more, the effect of suppressing the pressure loss improves. By comparison of the evaluation results of the plugged honeycomb structures of Examples 5 to 8, it has been seen that when a thickness of a bonding layer is adjusted in a range of 1.5 mm or less, the effect of suppressing the pressure loss improves. On the other hand, it has been seen that when the thickness of the bonding layer is 0.4 mm, a thermal shock resistance slightly deteriorates. Furthermore, by comparison of the evaluation results of the plugged honeycomb structures of Examples 9 to 12, it has been seen that when a thickness of a segment circumferential wall is adjusted in a range of 1.0 mm or less, the effect of suppressing the pressure loss improves. On the other hand, it has been seen that when the thickness of the segment circumferential wall is set to 0.2 mm, isostatic strength slightly deteriorates.

A plugged honeycomb structure of the present invention is utilizable as a trapping filter to remove particulates and the like included in an exhaust gas emitted from a direct injection type gasoline engine, a diesel engine or the like.

DESCRIPTION OF REFERENCE NUMERALS 1, 101 and 201: partition wall, 2, 102 and 202: cell, 2a, 102a and 202a: whole rim partition wall cell, 2b, 102b and 202b: partial rim circumferential wall cell, 2x, 102x and 202x: outflow cell (predetermined cell), 2y, 102y and 202y: inflow cell (residual cell), 3, 103 and 203: segment circumferential wall, 4, 104 and 204: honeycomb segment, 4A, 104A and 204A: plugged honeycomb segment, 5, 105 and 205: plugging portion, 6: bonding layer, 7: honeycomb segment bonded body, 8: outer wall, 11: inflow end face, 12: outflow end face, 13: first side, 14: second side, 15: third side, 16: fourth side, 18: whole rim partition wall cell region, 19: partial rim circumferential wall cell region, 100: plugged honeycomb structure, and CP1, CP2, P and Q: distance.

What is claimed is:
1. A plugged honeycomb structure comprising: a plurality of prismatic columnar honeycomb segments; a bonding layer bonding side surfaces of the plurality of honeycomb segments to one another, and
   plugging portions arranged in open ends of predetermined cells in an inflow end face of each honeycomb segment and arranged in open ends of residual cells in an outflow end face thereof,
   wherein each honeycomb segment has porous partition walls arranged to surround a plurality of cells extending from the inflow end face to the outflow end face, and segment circumferential walls arranged at an outermost circumference, in a cross section of the honeycomb segment which is perpendicular to an extending direction of the cells, at least two types of cells having different shapes are formed to constitute predetermined repeated arrangement patterns, the cells including the plugging portions arranged on the side of the inflow end face are defined as outflow cells, and the cells including the plugging portions arranged on the side of the outflow end face are defined as inflow cells, the cells of the honeycomb segment include whole rim partition wall cells and partial rim circumferential wall cells, the whole rim partition wall cells are the cells having whole rims of the cells which are surrounded by the partition walls, the partial rim circumferential wall cells are the cells having rims of the cells which are surrounded by the partition walls and the segment circumferential walls, a shape of the cross section of each partial rim circumferential wall cell which is perpendicular to the cell extending direction includes a shape of at least a part of the whole rim partition wall cell, and when a value obtained by dividing an average sectional area $S1_{in}$ of the inflow cells by an average sectional area $S1_{out}$ of the outflow cells in a region where the whole rim partition wall cells are present is denoted R1s, and a value obtained by dividing an average sectional area $S2_{in}$ of the inflow cells by an average sectional area $S2_{out}$ of the outflow cells in a region where the partial rim circumferential wall cells are present is denoted R2s, a ratio of the R2s to the R1s is in a range of 1.7 times or more and 2.0 times or less.

2. The plugged honeycomb structure according to claim 1, wherein except for a circumferential region of the honeycomb segment where the partial rim circumferential wall cells are formed, the plugging portions are arranged in the open ends of the cells of the honeycomb segment so that the inflow cells surround the outflow cell.

3. The plugged honeycomb structure according to claim 1, wherein a thickness of the segment circumferential wall of the honeycomb segment is from 0.3 to 1.0 mm.

4. The plugged honeycomb structure according to claim 1, wherein a thickness of the bonding layer is from 0.5 to 1.5 mm.

5. The plugged honeycomb structure according to claim 1, wherein when the shortest distance in mutual distances between two facing partition walls in the inflow cells is defined as a cell open width, an average value of the cell open widths of the inflow cells is 0.5 mm or more.

6. The plugged honeycomb structure according to claim 1, wherein the average sectional area $S2_{in}$ of the inflow cells in the region where the partial rim circumferential wall cells are present is 4 $mm^2$ or less.

7. The plugged honeycomb structure according to claim 1, wherein in the region where the whole rim partition wall cells are present, each of the inflow cell and the outflow cell has one type of sectional shape.

* * * * *